United States Patent
Jiang

(10) Patent No.: US 12,452,005 B2
(45) Date of Patent: Oct. 21, 2025

(54) BLIND RETRANSMISSION METHOD AND APPARATUS, AND BLIND RETRANSMISSION INDICATION METHOD AND APPARATUS

(71) Applicant: BEIJING XIAOMI MOBILE SOFTWARE CO., LTD., Beijing (CN)

(72) Inventor: Xiaowei Jiang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 389 days.

(21) Appl. No.: 18/014,142

(22) PCT Filed: Aug. 27, 2020

(86) PCT No.: PCT/CN2020/111929
§ 371 (c)(1),
(2) Date: Dec. 30, 2022

(87) PCT Pub. No.: WO2022/041084
PCT Pub. Date: Mar. 3, 2022

(65) Prior Publication Data
US 2023/0261809 A1    Aug. 17, 2023

(51) Int. Cl.
*H04L 1/1867* (2023.01)
*H04L 1/1812* (2023.01)
*H04W 72/1268* (2023.01)

(52) U.S. Cl.
CPC ............ *H04L 1/189* (2013.01); *H04L 1/1812* (2013.01); *H04W 72/1268* (2013.01)

(58) Field of Classification Search
None
See application file for complete search history.

(56) References Cited

U.S. PATENT DOCUMENTS

| 9,876,610 B2 | 1/2018 | Li et al. | |
|---|---|---|---|
| 2015/0092740 A1 | 4/2015 | Li et al. | |
| 2019/0013903 A1* | 1/2019 | Zhang | H04L 1/1854 |

(Continued)

FOREIGN PATENT DOCUMENTS

| CN | 103873211 A | 6/2014 |
|---|---|---|
| CN | 105103624 A | 11/2015 |

(Continued)

OTHER PUBLICATIONS

International Search Report issued in Application No. PCT/CN2020/111929, dated May 27, 2021, with English translation, (4p).

(Continued)

*Primary Examiner* — Lonnie V Sweet
(74) *Attorney, Agent, or Firm* — Arch & Lake LLP; Hao Tan; Shen Wang

(57) ABSTRACT

A blind retransmission method and apparatus, and a blind retransmission indication method and apparatus are provided. The blind retransmission method may include: receiving configuration information of blind retransmission sent by a base station; performing blind retransmission communication with the base station according to the configuration information. According to the present application, the terminal can perform blind retransmission communication with the base station according to the configuration information.

18 Claims, 12 Drawing Sheets

(56) References Cited

U.S. PATENT DOCUMENTS

| | | | |
|---|---|---|---|
| 2019/0253186 A1* | 8/2019 | Khoshnevisan | H04L 1/0003 |
| 2020/0107302 A1 | 4/2020 | Chen et al. | |
| 2020/0351030 A1* | 11/2020 | Deogun | H04L 1/1887 |
| 2021/0068146 A1* | 3/2021 | Miao | H04L 5/0044 |
| 2022/0264616 A1* | 8/2022 | Shah | H04L 1/1887 |
| 2022/0303952 A1* | 9/2022 | Hoang | H04W 72/542 |

FOREIGN PATENT DOCUMENTS

| | | |
|---|---|---|
| CN | 108023688 A | 5/2018 |
| CN | 104170445 A | 6/2018 |
| CN | 104170445 B | 6/2018 |
| CN | 108924854 A | 11/2018 |
| CN | 109756996 A | 5/2019 |
| CN | 110798888 A | 2/2020 |
| CN | 110912653 A | 3/2020 |
| CN | 110943816 A | 3/2020 |
| CN | 111342939 A | 6/2020 |
| EP | 3499767 A1 | 6/2019 |
| EP | 3550904 A1 | 10/2019 |
| EP | 1207644 A2 | 5/2022 |
| WO | 2018024946 A1 | 2/2018 |
| WO | 2020083477 A1 | 4/2020 |
| WO | 2020088540 A1 | 5/2020 |
| WO | 2020107479 A1 | 6/2020 |

OTHER PUBLICATIONS

First CNOA issued in Application No. 202080002082.7, dated Dec. 2, 2022, (10p).

Notice of Allowance Issued in CN Application No. 202080002082.7 dated Nov. 28, 2023 with English translation, (9p).

Jose Rey/Matsushita et al., "RTP Retransmission Payload Format," RFC Editor, Section 10 of RFC2026, Nov. 30, 2002, (18p).

Lin Lin et al., "Analysis of the communication standardization and industry development of internet of vehicles," Telecommunications Science, vol. 36 No. 4 Apr. 20, 2020, (12p).

* cited by examiner

BLIND RETRANSMISSION METHOD AND APPARATUS, AND BLIND RETRANSMISSION INDICATION METHOD AND APPARATUS

CROSS-REFERENCE TO RELATED APPLICATION

The application is a U.S. National Stage of International Application No. PCT/CN2020/111929 filed on Aug. 27, 2020, the entire content of which is incorporated herein by reference for all purposes.

TECHNICAL FIELD

The present disclosure relates to the field of communication technologies, and in particular, to a blind retransmission method, a blind retransmission indication method, a blind retransmission apparatus, a blind retransmission indication apparatus, an electronic device, and a computer-readable storage medium.

BACKGROUND

During the communication between the terminal and the base station, after the sending end sends information to the receiving end, the receiving end may send a Hybrid Automatic Repeat reQuest (HARQ) feedback to the sending end, and the sending end may determine whether the receiving end needs retransmission of information according to the feedback.

In Non-Terrestrial Networks (NTN for short), the terminals and the base stations can communicate with devices located in the air such as satellites. However, since satellites are generally located at high positions, there will be a large delay in communication through satellites, which will affect the process of the receiving end sending the HARQ feedback to the sending end. Therefore, the related art proposes a solution for prohibiting the receiving end from sending the HARQ feedback to the sending end.

SUMMARY

The embodiments of the present disclosure propose a blind retransmission method, a blind retransmission indication method, a blind retransmission apparatus, a blind retransmission indication apparatus, an electronic device, and a computer-readable storage medium to solve the technical problems in the related art.

According to the first aspect of the embodiments of the present disclosure, a blind retransmission method is proposed, which is applicable to a terminal, and the method includes:

receiving configuration information of blind retransmission sent by a base station;

performing blind retransmission communication with the base station according to the configuration information.

According to a second aspect of the embodiments of the present disclosure, a blind retransmission indication method is proposed, which is applicable to a base station, and the method includes:

sending configuration information of blind retransmission to a terminal, where the configuration information is configured to instruct the terminal to perform blind retransmission communication with the base station according to the configuration information.

According to a third aspect of the embodiments of the present disclosure, a blind retransmission apparatus is proposed, which is applicable to a terminal, and the apparatus includes:

a configuration receiving module, configured to receive configuration information of blind retransmission sent by a base station;

a blind retransmission module, configured to perform blind retransmission communication with the base station according to the configuration information.

According to a fourth aspect of the embodiments of the present disclosure, a blind retransmission indication apparatus is proposed, which is applicable to a base station, and the apparatus includes:

a configuration sending module, configured to send configuration information of blind retransmission to a terminal, where the configuration information is configured to instruct the terminal to perform blind retransmission communication with the base station according to the configuration information.

According to a fifth aspect of the embodiments of the present disclosure, an electronic device is provided, including:

a processor;

a memory for storing instructions executable by the processor;

where the processor is configured to implement the above-mentioned blind retransmission method and/or blind retransmission indication method.

According to a sixth aspect of the embodiments of the present disclosure, a computer-readable storage medium is provided on which a computer program is stored, and when the program is executed by a processor, the steps in the blind retransmission method and/or the blind retransmission indication method are implemented.

BRIEF DESCRIPTION OF THE DRAWINGS

In order to illustrate the technical solutions in the embodiments of the present disclosure more clearly, the following briefly introduces the accompanying drawings used in the description of the embodiments. Obviously, the accompanying drawings in the following description are only some embodiments of the present disclosure. For those of ordinary skill in the art, other drawings can also be obtained from these drawings without creative labor.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

Figure 1:
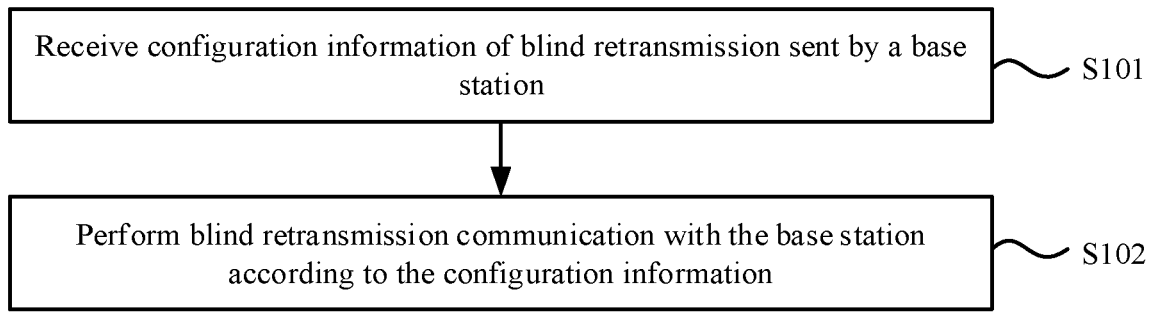
FIG. 1 is a schematic flowchart of a blind retransmission method according to an embodiment of the present disclosure.

FIG. 1 is a schematic flowchart of a blind retransmission method according to an embodiment of the present disclosure. The blind retransmission method shown in this Embodiment may be applicable to a terminal, and the terminal includes, but is not limited to, electronic devices such as mobile phones, tablet computers, wearable devices, sensors, and Internet of Things devices. The terminal may communicate with a base station as a user equipment, and the base station includes, but is not limited to, base stations in communication systems such as a 4G base station, a 5G base station, and a 6G base station. In one embodiment, the base station may be a base station to which the blind retransmission indication method described in any subsequent embodiment is applicable.

In one embodiment, the terminal and the base station may be in a non-terrestrial network and communicate via a device located in air, such as a satellite. Taking a satellite as an example, the satellite can transmit information sent by a sending end to a receiving end through a transparent transmission mode. During this process, the satellite does not demodulate the information, but only performs non-demodulation operations such as signal amplification. The satellite may also send the information sent by the sending end to the receiving end through a regeneration mode (may be called on-satellite regeneration). During this process, the satellite demodulates and decodes the information, then recodes and modulates it, and then sends it to the receiving end.

As shown in FIG. 1, the blind retransmission method may include the following steps.

In step S101, configuration information of blind retransmission sent by a base station is received.

In step S102, blind retransmission communication is performed with the base station according to the configuration information.

In one embodiment, the base station may send configuration information of blind retransmission to the terminal, and the configuration information includes, but is not limited to, a time interval of blind retransmission, the number of blind retransmissions, a time window of blind retransmission, and the like. The terminal may perform blind retransmission communication with the base station according to the configuration information, for example, performing blind retransmission of uplink information to the base station, for another example, receiving the blind retransmission of downlink information from the base station.

It should be noted that the blind retransmission in all embodiments of the present disclosure may be understood as an operation of retransmitting information to the receiving end automatically performed by the sending end when no hybrid automatic repeat request feedback from the receiving end is received.

For example, the sending end is the terminal, and the receiving end is the base station. After the terminal sends uplink information to the base station in the non-terrestrial network, the non-terrestrial network prohibits the receiving end from sending HARQ feedback to the sending end, then the base station will not send the HARQ feedback to the terminal regardless of whether the uplink information is received, and thus the terminal cannot determine whether the base station has received the uplink information.

In this case, the terminal may perform blind retransmission of the uplink information to the base station according to the configuration information, and the base station may receive the blind retransmission of uplink information from the terminal according to the configuration information. In the case that the base station has not received the uplink information, it is beneficial to ensure that the base station can receive the uplink information, and in the case that the base station has received the uplink information, performing blind retransmission of the uplink information to the base station only additionally occupies some uplink resources, and there is no serious impact.

For example, the sending end is the base station, and the receiving end is the terminal. After the base station sends downlink information to the terminal in the non-terrestrial network, the non-terrestrial network prohibits the receiving end from sending HARQ feedback to the sending end, then the terminal will not send the HARQ feedback to the base station regardless of whether the downlink information is received, and thus the base station cannot determine whether the base station has received the downlink information.

In this case, the base station may perform blind retransmission of the downlink information to the terminal according to the configuration information, and the terminal may receive the blind retransmission of the downlink information from the base station according to the configuration information. In the case that the terminal has not received the downlink information, it is beneficial to ensure that the terminal can receive the downlink information, and in the case that the terminal has received the downlink information, performing blind retransmission of the downlink information to the terminal will only additionally occupy some uplink resources, and there is no serious impact.

According to the embodiments of the present disclosure, the terminal may perform blind retransmission communication with the base station according to the configuration information, so that even if the receiving end is prohibited from sending HARQ feedback to the sending end, the sending end can perform blind retransmission of the information, which is beneficial to ensure that the receiving end receives the information sent by the sending end in the communication process, thereby enabling the subsequent communication process to proceed smoothly.

It should be noted that the terminal may selectively execute step S102.

For example, the terminal may receive blind retransmission indication information sent by a network side device, where the network side device includes, but is not limited to, a base station and a core network. Based on the blind retransmission indication information, it can be determined whether blind retransmission can be performed. If it is determined that blind retransmission can be performed, step S102 is performed. If it is determined that blind retransmission cannot be performed, step S102 is not performed.

For example, the terminal may receive prohibition information sent by the network side device, and upon receiving the prohibition information, it may determine that the receiving end is prohibited from sending the hybrid automatic repeat request feedback to the sending end, and at the same time, it is determined that blind retransmission can be performed, and then step S102 may be performed. However, if the terminal does not receive the prohibition information, step S102 is not executed.

Figure 2:
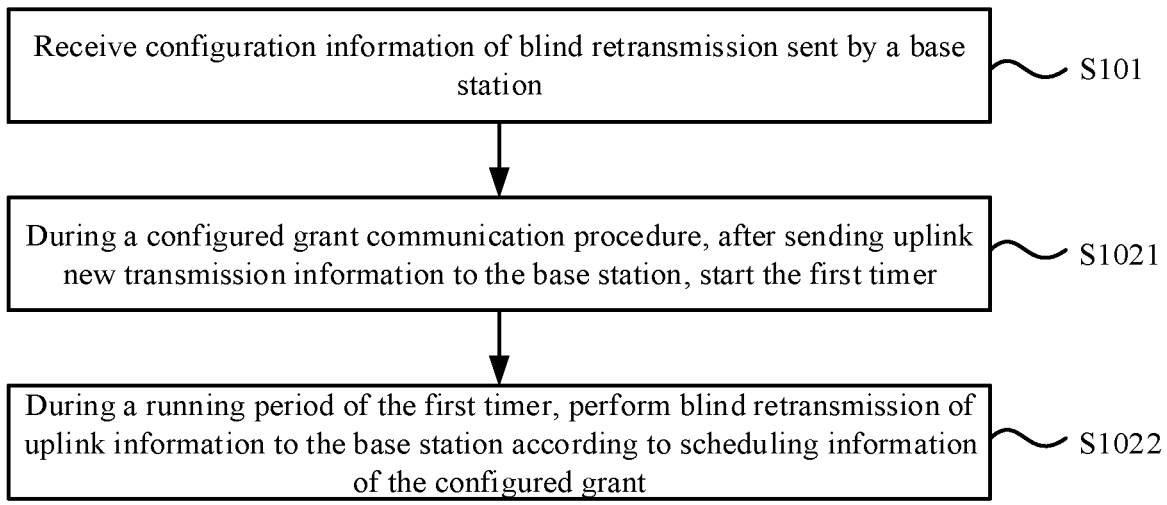
FIG. 2 is a schematic flowchart of another blind retransmission method according to an embodiment of the present disclosure.

FIG. 2 is a schematic flowchart of another blind retransmission method according to an embodiment of the present disclosure. As shown in FIG. 2, the configuration information includes a first timer, and the performing blind retransmission communication with the base station according to the configuration information includes the following steps.

In step S1021, during a configured grant communication procedure, after sending uplink new transmission information to the base station, the first timer is started.

In step S1022, during a running period of the first timer, blind retransmission of uplink information to the base station is performed according to scheduling information of the configured grant.

In one embodiment, the terminal may perform uplink communication with the base station based on a Configured Grant (CG for short). In this case, the configuration information may include a first timer, and the terminal may start the first timer after sending the uplink new transmission information (which may be understood as non-retransmission information) to the base station. Furthermore, during the running period of the first timer (i.e., before the first timer expires), the blind retransmission of uplink information to the base station may be performed according to the scheduling information of the configured grant, and during the running period of the first timer, the uplink new transmission information may not be sent to the base station.

The timing duration of the first timer may be understood as a time window for blind retransmission. During this time window, the terminal performs blind retransmission of the uplink information to the base station. After the first timer expires, that is, outside the time window, the terminal stops the blind retransmission of the uplink information to the base station, but may send the uplink new transmission information to the base station.

The first timer may be a configured grant timer, or a newly set timer. The general use of the configured grant timer is that during the running period of the configured grant timer, the terminal may retransmit information to the base station without sending uplink new transmission information to the base station. In this embodiment, the configured grant timer is used as the first timer, which is equivalent to multiplexing the configured grant timer, so that it is unnecessary to newly set a timer, which is beneficial to reduce the signaling consumption of the setting operation.

In one embodiment, in the uplink new transmission information sent by the terminal to the base station, a new transmission identifier may be carried, so that the base station determines that the received information is the new transmission information. In the uplink information of blind retransmission from the terminal to the base station, a blind retransmission identifier may be carried, so that the base station determines that the received information is the blind retransmission information.

Figure 3:
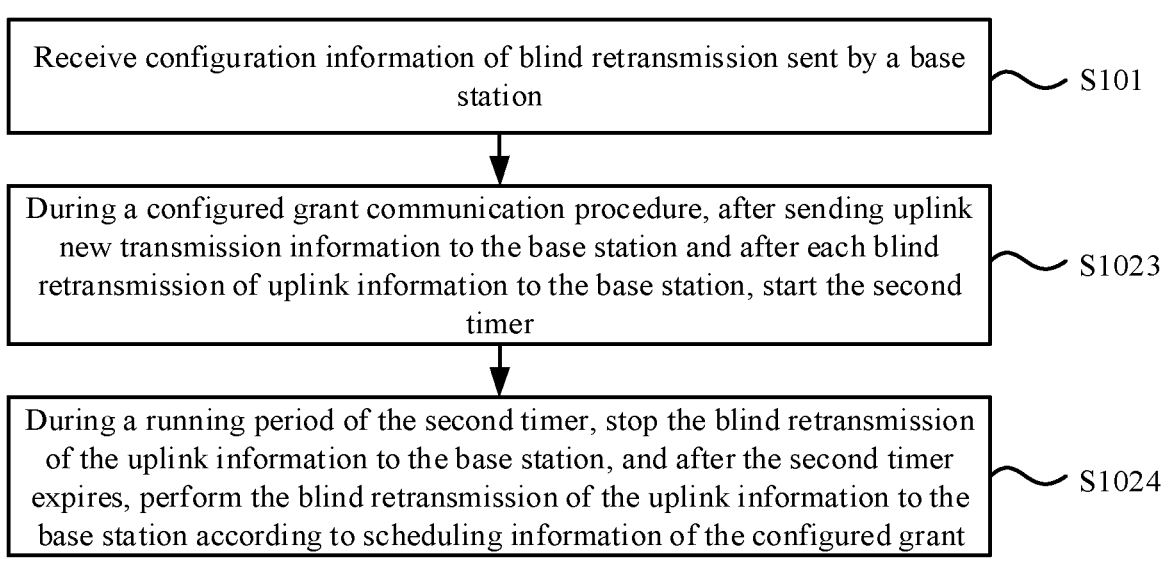
FIG. 3 is a schematic flowchart of yet another blind retransmission method according to an embodiment of the present disclosure.

FIG. 3 is a schematic flowchart of yet another blind retransmission method according to an embodiment of the present disclosure. As shown in FIG. 3, the configuration information includes a second timer, and the performing blind retransmission communication with the base station according to the configuration information includes the following steps.

In step S1023, during a configured grant communication procedure, after sending uplink new transmission information to the base station and after each blind retransmission of uplink information to the base station, the second timer is started.

In step S1024, during a running period of the second timer, the blind retransmission of the uplink information to the base station is stopped, and after the second timer expires, the blind retransmission of uplink information to the base station is performed according to scheduling information of the configured grant.

In one embodiment, the terminal may perform uplink communication with the base station based on the configured grant. In this case, the configuration information may include a second timer, and after the terminal sends the uplink new transmission information to the base station and after every time the terminal performs blind retransmission of the uplink information to the base station, the second timer may be started. Furthermore, during the running period of the second timer, the blind retransmission of uplink information to the base station may be stopped; and after the second timer expires, the blind retransmission of uplink information to the base station may be performed according to the scheduling information of the configured grant.

The timing duration of the second timer may be understood as a time interval of blind retransmission. During this time interval, the terminal stops the blind retransmission of uplink information to the base station. After the second timer expires, that is, outside the time interval, the terminal may perform blind retransmission of uplink information to the base station.

The second timer may be a configured grant retransmission timer cg-RetransmissionTimer, or may be a newly set timer. The general use of the configured grant retransmission timer is that the terminal does not retransmit information to the base station during the operation of the configured grant retransmission timer. In this embodiment, the configured grant timer is used as the second timer, which is equivalent to multiplexing the configured grant retransmission timer, so that it is unnecessary to set a new timer, which is beneficial to reduce the signaling consumption of the setting operation.

It should be noted that the timing duration of the second timer may be shorter than the timing duration of the first timer. Within the timing duration of the first timer, the second timer may be started multiple times, that is, within the time window of blind retransmission, there may be a plurality of time intervals of blind retransmission.

In one embodiment, steps S1021 to S1024 may be selectively executed, for example, the configuration information received by the terminal includes the first timer, and it is determined that blind retransmission can be performed, then steps S1021 and S1022 are executed, otherwise, steps S1021 and S1022 are not executed. For example, the configuration information received by the terminal includes the second timer, and it is determined that blind retransmission can be performed, then steps S1023 and S1024 are performed, otherwise, steps S1023 and S1024 are not performed.

Optionally, an identifier of a hybrid automatic repeat request process used for performing blind retransmission of uplink information to the base station is determined according to an uplink time of performing blind retransmission of the uplink information to the base station.

In one embodiment, the second timer may be a configured grant retransmission timer or a newly set timer. In the related art, the second timer, such as the configured grant retransmission timer, is applicable only to the case where the terminal in the unlicensed carrier selects the identifier of the HARQ process (HARQ ID) from a candidate identifier pool, and it is not applicable to the case where the terminal in the licensed carrier calculates the identifier of the HARQ process according to the uplink time of sending uplink information.

However, in this embodiment, the uplink time (or called the uplink moment) for the terminal to perform blind retransmission of uplink information to the base station is not fixed. In this case, it is difficult to determine the candidate identifier pool, and the terminal needs to calculate the identifier of the HARQ process according to the uplink time. Therefore, the configured grant retransmission timer may be extended to be applicable to the situation where the terminal calculates the identifier of the HARQ process according to the uplink time of sending uplink information in the licensed carrier, and then the blind retransmission of uplink information to the base station is performed in the HARQ process corresponding to the calculated identifier.

Figure 4:
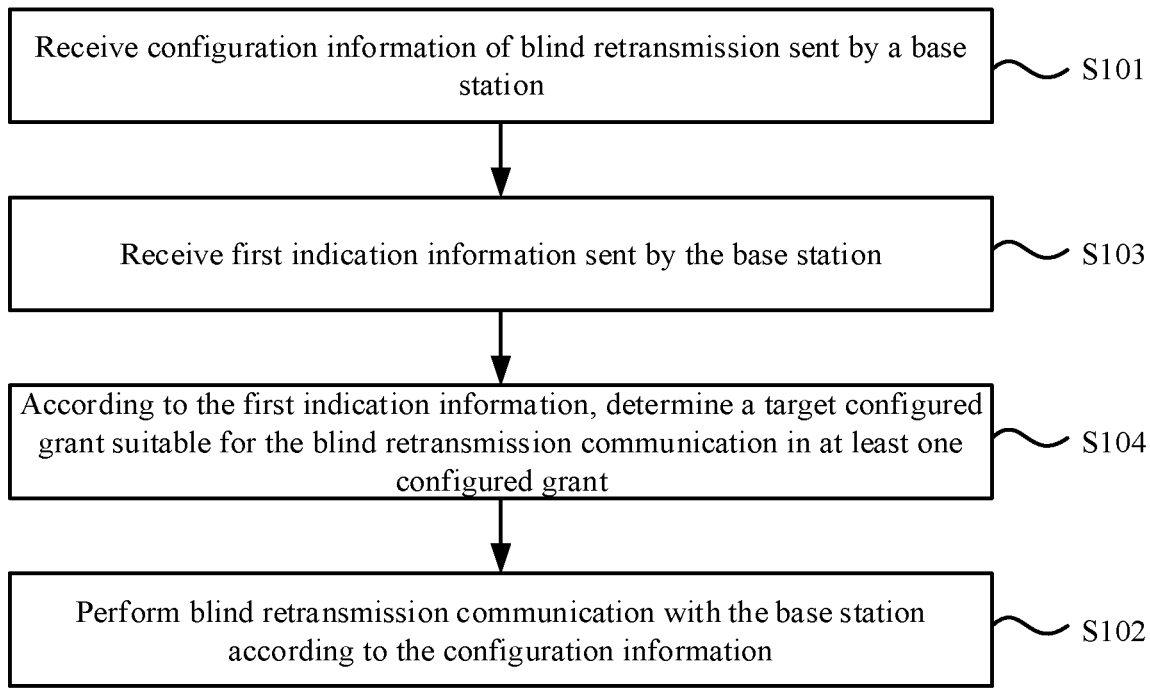
FIG. 4 is a schematic flowchart of yet another blind retransmission method according to an embodiment of the present disclosure.

FIG. 4 is a schematic flowchart of yet another blind retransmission method according to an embodiment of the present disclosure. As shown in FIG. 4, the method further includes the following steps.

In step S103, first indication information sent by the base station is received.

In step S104, according to the first indication information, a target configured grant suitable for the blind retransmission communication is determined in at least one configured grant.

In one embodiment, the base station may pre-configure at least one configured grant for the terminal, so that the terminal stores scheduling information of at least one configured grant, and then the base station may send first indication information to the terminal to instruct the terminal to select which configured grant to use, for example, the indicated configured grant is the target configured grant.

Figure 5:
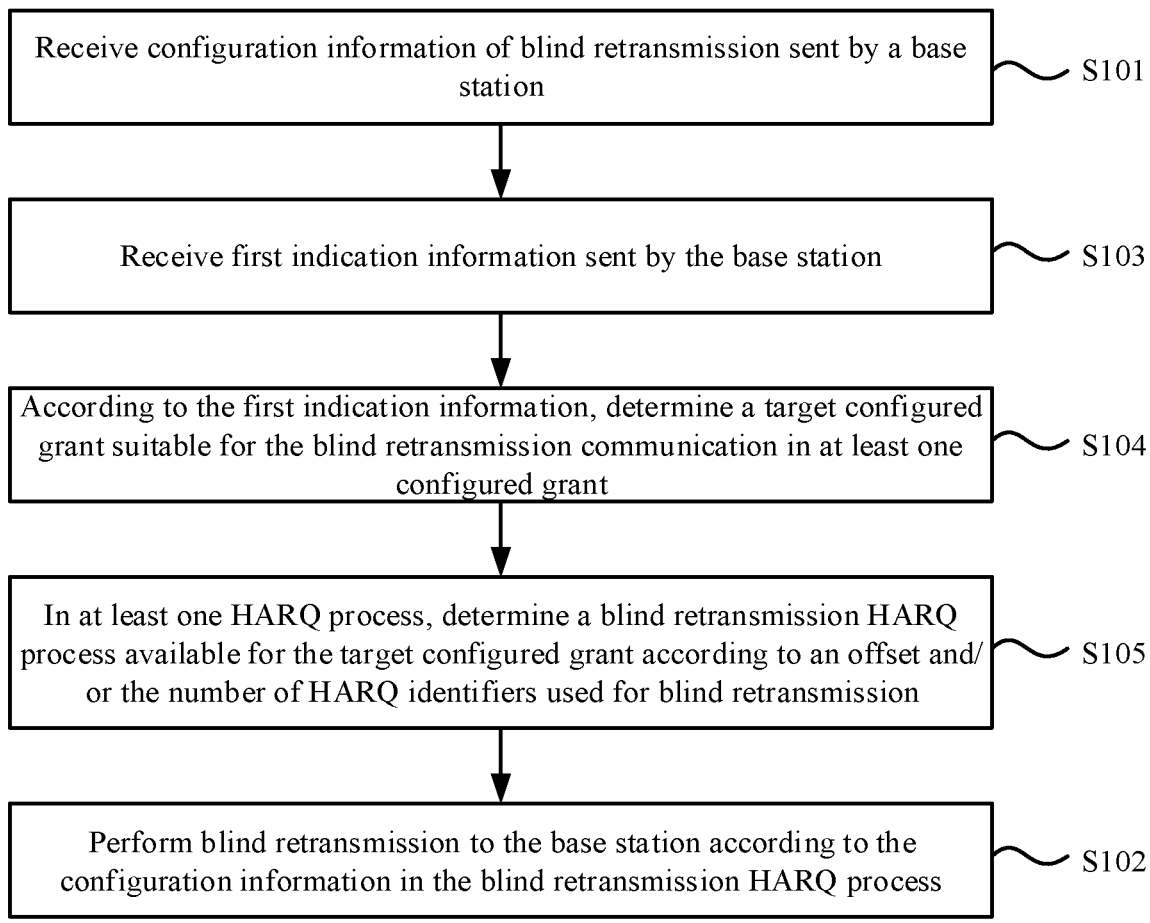
FIG. 5 is a schematic flowchart of yet another blind retransmission method according to an embodiment of the present disclosure.

FIG. 5 is a schematic flowchart of yet another blind retransmission method according to an embodiment of the present disclosure. As shown in FIG. 5, the method further includes the following steps.

In step S105, in at least one HARQ process, a blind retransmission HARQ process available for the target configured grant is determined according to an offset and/or the number of HARQ identifiers used for blind retransmission.

In one embodiment, the base station may pre-configure at least one HARQ process for the terminal, and the target configured grant may be associated with one or more HARQ processes in the at least one HARQ process.

Since the uplink time for the terminal to perform blind retransmission of uplink information to the base station is not fixed, the terminal needs to calculate the identifier of the HARQ process according to the uplink time, and then according to the identifier, determine which HARQ process is specifically selected to perform blind retransmission of uplink information in the at least one HARQ process associated with the target configured grant.

In one embodiment, the terminal may determine the blind retransmission HARQ process available for the target configured grant according to the offset and/or the number of HARQ identifiers used for blind retransmission, for example, it may calculate the identifier of the available blind retransmission HARQ process (HARQ Process ID) according to the offset and the number:

for example, HARQ Process ID=[floor(CURRENT_symbol/periodicity)]modulo nrofHARQ-Processes+harq-ProcID-Offset;

where CURRENT symbol is the uplink time at which the terminal performs blind retransmission of uplink information to the base station according to the configuration information and the scheduling information of the target configured grant, and specifically may be the first Orthogonal Frequency Division Multiplexing symbol (OFDM symbol) for sending uplink information, periodicity is a period of the target configured grant, nrofHARQ-Processes is the number, harq-ProcID-Offset is the offset, floor means rounding, and modulo means modulo.

For example, the base station pre-configures 5 HARQ processes for the terminal, the identifiers are 0 to 4, the number is 3, and the offset is 2, which is equivalent to a backward offset of 2 identifiers from the first identifier, and then three identifiers are taken to obtain the identifiers 2, 3 and 4, that is, the HARQ processes corresponding to the identifiers 2 to 4 are the available blind retransmission HARQ processes, and then the terminal may perform blind retransmission of uplink information to the base station in these blind retransmission HARQ processes.

Figure 6:
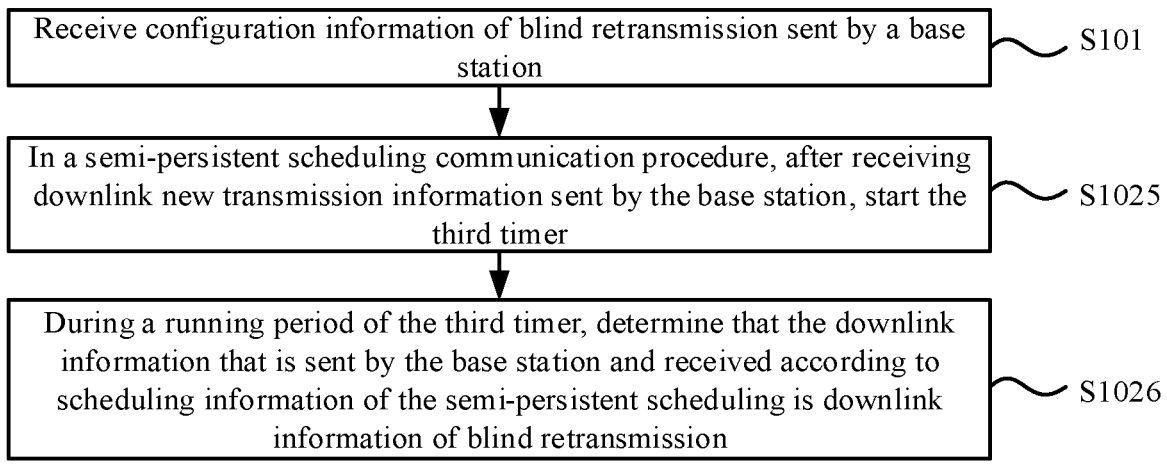
FIG. 6 is a schematic flowchart of yet another blind retransmission method according to an embodiment of the present disclosure.

FIG. 6 is a schematic flowchart of yet another blind retransmission method according to an embodiment of the present disclosure. As shown in FIG. 6, the configuration information includes a third timer, and the performing blind retransmission communication with the base station according to the configuration information includes the following steps.

In step S1025, in a semi-persistent scheduling communication procedure, after receiving downlink new transmission information sent by the base station, the third timer is started.

In step S1026, during a running period of the third timer, it is determined that the received downlink information sent by the base station is downlink information of blind retransmission.

In one embodiment, the base station may perform downlink communication with the terminal based on Semi-Persistent Scheduling (SPS for short, also called semi-static scheduling). In this case, the configuration information may include a third timer, and the terminal may start the third timer after receiving the downlink new transmission information sent by the base station. Furthermore, during the operation of the third timer, the blind retransmission of the downlink information from the base station can be received according to the scheduling information of the semi-persistent scheduling, that is, during the operation of the third timer, the terminal determines the downlink information received from the base station as the downlink information of blind retransmission. After the third timer expires, the terminal may determine the downlink information received from the base station as the newly transmitted downlink information.

The timing duration of the third timer may be understood as a time window of blind retransmission. During this time window, the base station performs blind retransmission of downlink information to the terminal. After the third timer expires, that is, outside the time window, the base station stops the blind retransmission of the downlink information to the terminal, but may send the downlink new transmission information to the terminal.

In one embodiment, the downlink new transmission information sent by the base station to the terminal may carry a new transmission identifier, so that the terminal determines that the received information is the newly transmitted information. The blind retransmission identifier may be carried in the downlink information of blind retransmission from the base station to the terminal, so that the terminal can determine that the received information is information of blind retransmission.

Figure 7:
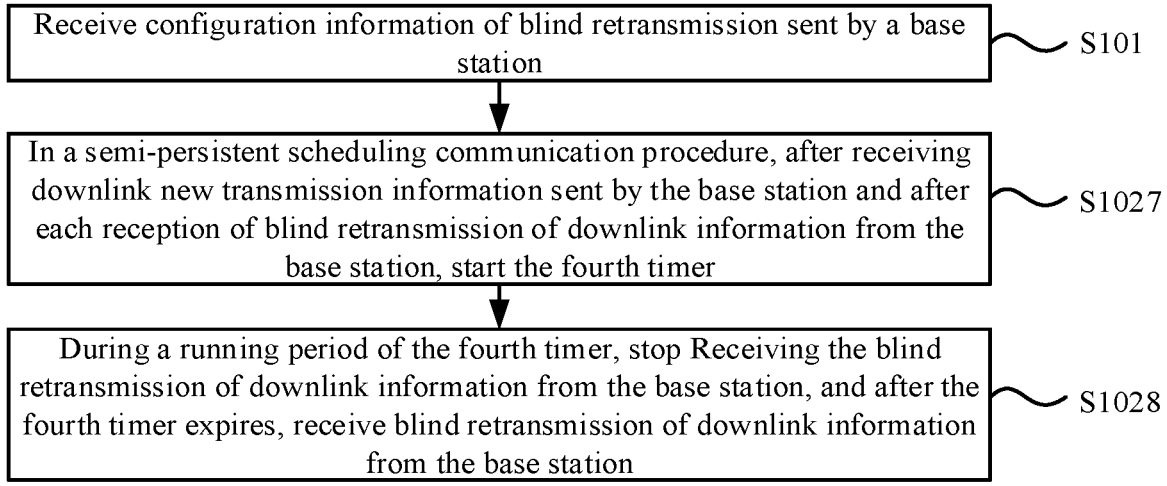
FIG. 7 is a schematic flowchart of yet another blind retransmission method according to an embodiment of the present disclosure.

FIG. 7 is a schematic flowchart of yet another blind retransmission method according to an embodiment of the present disclosure. As shown in FIG. 7, the configuration information includes a fourth timer, and the performing blind retransmission communication with the base station according to the configuration information includes the following steps.

In step S1027, in a semi-persistent scheduling communication procedure, after receiving downlink new transmission information sent by the base station and after each reception of blind retransmission of downlink information from the base station, the fourth timer is started.

In step S1028, during a running period of the fourth timer, receiving blind retransmission of downlink information from the base station is stopped, and after the fourth timer expires, blind retransmission of downlink information from the base station is received.

In one embodiment, the base station may perform downlink communication with the terminal based on semi-persistent scheduling. In this case, the configuration information may include a fourth timer, after the terminal receives the downlink new transmission information sent by the base station and after each reception of blind retransmission of the downlink information from the base station, a fourth timer may be started. Furthermore, during the running period of the fourth timer, receiving the blind retransmission of the downlink information from the base station may be stopped; and after the fourth timer expires, the blind retransmission of the downlink information from the base station may be received.

The timing duration of the fourth timer may be understood as a time interval of blind retransmission. During this time interval, the base station stops the blind retransmission of downlink information to the terminal. After the fourth timer expires, that is, outside the time interval, the base station may perform blind retransmission of downlink information to the terminal.

It should be noted that the timing duration of the fourth timer may be shorter than the timing duration of the third timer, and within the timing duration of the third timer, the fourth timer may be started multiple times, that is, in the time window of blind retransmission, there may be a plurality of time intervals of blind retransmission.

In one embodiment, steps S1025 to S1028 may be selectively executed, for example, the configuration information received by the terminal includes the third timer, and it is determined that blind retransmission can be performed, then steps S1025 and S1026 are executed, otherwise, steps S1025 and S1026 are not executed. For example, the configuration information received by the terminal includes the fourth timer, and it is determined that blind retransmission can be performed, then steps S1027 and S1028 are performed, otherwise, steps S1027 and S1028 are not performed.

Figure 8:
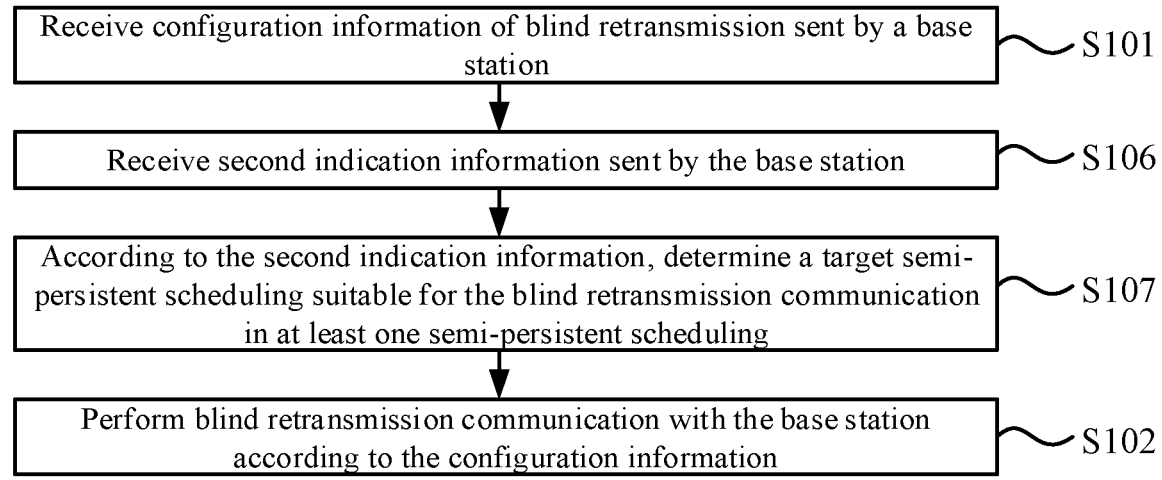
FIG. 8 is a schematic flowchart of yet another blind retransmission method according to an embodiment of the present disclosure.

FIG. 8 is a schematic flowchart of yet another blind retransmission method according to an embodiment of the present disclosure. As shown in FIG. 8, the method further includes the following steps.

In step S106, second indication information sent by the base station is received.

In step S107, according to the second indication information, a target semi-persistent scheduling suitable for the blind retransmission communication is determined in at least one semi-persistent scheduling.

In one embodiment, the base station may pre-configure at least one semi-persistent scheduling for the terminal, so that the terminal stores scheduling information of at least one semi-persistent scheduling, and then the base station may send second indication information to the terminal to instruct the terminal which semi-persistent scheduling to select, for example, the indicated semi-persistent schedule is the target semi-persistent schedule.

Figure 9:
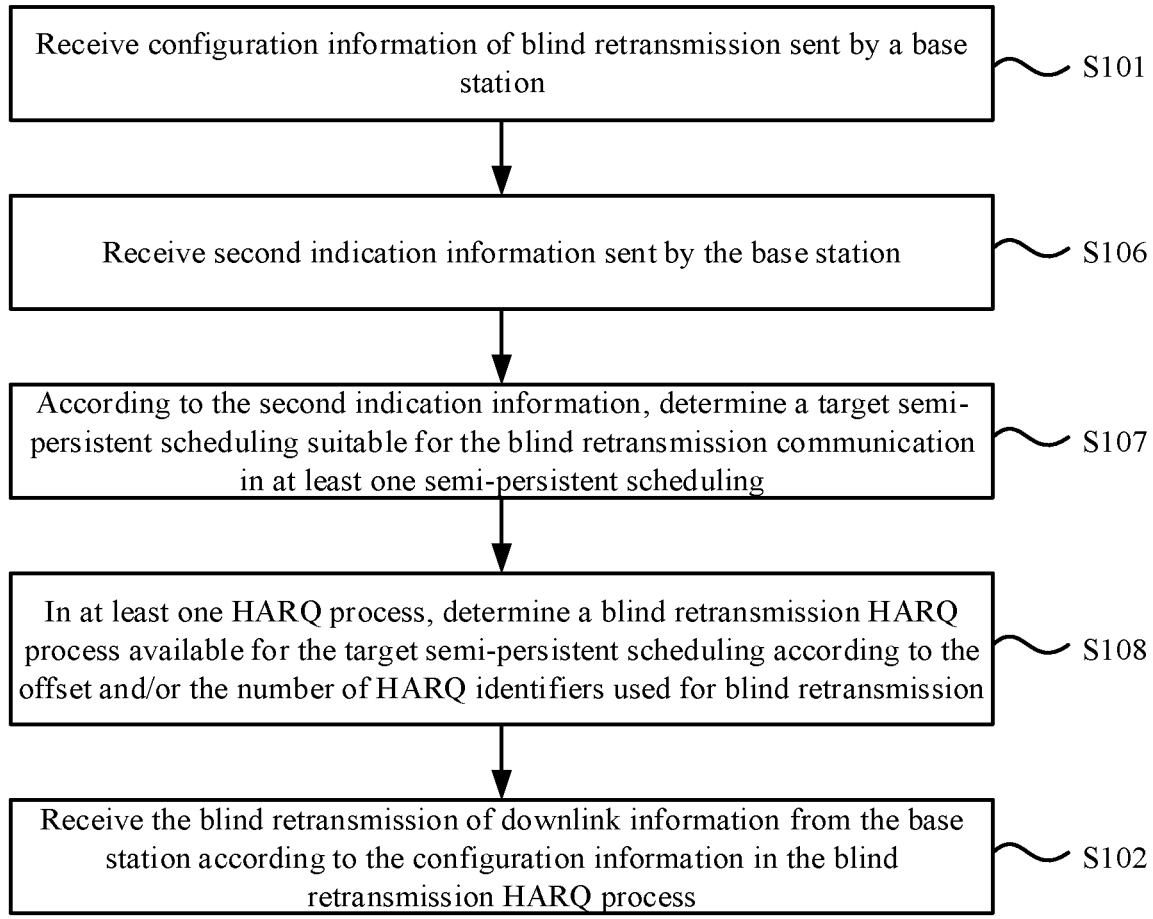
FIG. 9 is a schematic flowchart of yet another blind retransmission method according to an embodiment of the present disclosure.

FIG. 9 is a schematic flowchart of yet another blind retransmission method according to an embodiment of the present disclosure. As shown in FIG. 9, the method further includes the following steps.

In step S108, in at least one HARQ process, a blind retransmission HARQ process available for the target semi-persistent scheduling is determined according to the offset and/or the number of HARQ identifiers used for blind retransmission.

In one embodiment, the base station may pre-configure at least one HARQ process for the terminal, and the target configured grant may be associated with one or more HARQ processes in the at least one HARQ process.

Since the downlink time for the terminal to receive the blind retransmission downlink information from the base station is not fixed, the terminal needs to calculate the identifier of the HARQ process according to the downlink time, and then determine which HARQ process is specifically selected for receiving the blind retransmission of downlink information in the at least one HARQ process associated with the target semi-persistent scheduling according to the identifier.

In one embodiment, the terminal may determine the blind retransmission HARQ process available for the target semi-persistent scheduling according to the offset and/or the number of HARQ identifiers used for blind retransmission, for example, it may first calculate the identifier of available blind retransmission HARQ process (HARQ Process ID) according to the offset and the number:

for example, HARQ Process ID=[floor(CURRENT_slot/periodicity)]modulo nrofHARQ-Processes+harq-ProcID-Offset;

where CURRENT_slot is the downlink time for the terminal to receive the blind retransmission of the downlink information from the base station according to the configuration information and the scheduling information of the target semi-persistent scheduling, in particular, which may be the first slot in which the downlink information is received, periodicity is a period of the target semi-persistent scheduling, nrofHARQ-Processes is the number, harq-ProcID-Offset is the offset, floor means rounding, and modulo means modulo.

For example, the base station pre-configures 6 HARQ processes for the terminal, the identifiers are 0 to 5, the number is 2, and the offset is 3, which is equivalent to a backward offset of 3 identifiers from the first identifier, and then 2 identifiers are taken to obtain the identifiers 3 and 4, that is, the HARQ processes corresponding to the identifiers 2 and 3 are the available blind retransmission HARQ processes, and then the terminal can receive the blind retransmission of the downlink information from the base station in these blind retransmission HARQ processes.

Figure 10:
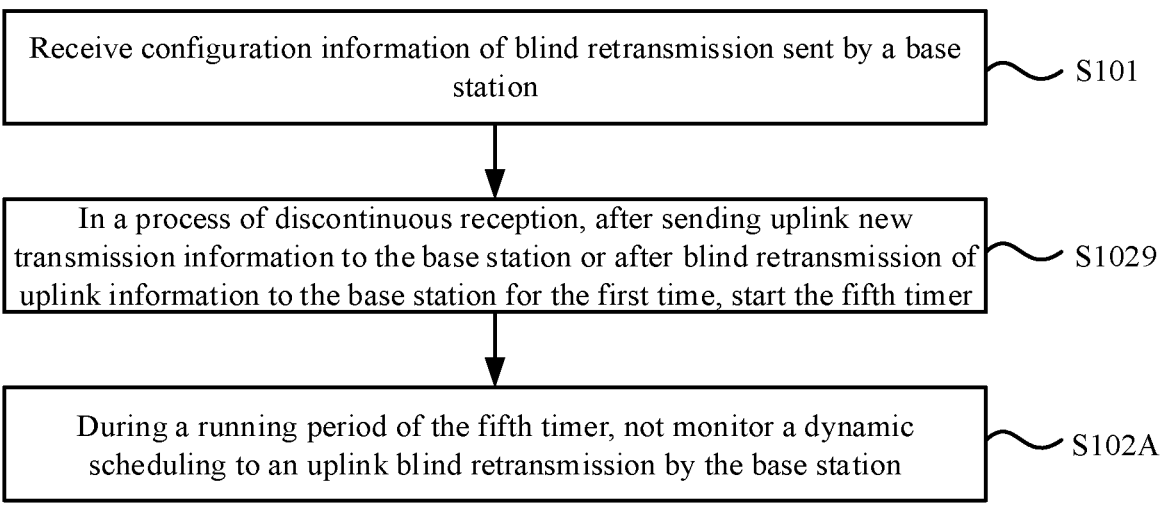
FIG. 10 is a schematic flowchart of yet another blind retransmission method according to an embodiment of the present disclosure.

FIG. 10 is a schematic flowchart of yet another blind retransmission method according to an embodiment of the present disclosure. As shown in FIG. 10, the configuration information includes a fifth timer, and the performing blind retransmission communication with the base station according to the configuration information includes the following steps.

In step S1029, in a process of discontinuous reception, after sending uplink new transmission information to the base station or after the blind retransmission of uplink information to the base station for the first time, the fifth timer is started.

In step S102A, during a running period of the fifth timer, a dynamic scheduling of an uplink blind retransmission from the base station is not monitored.

In one embodiment, the terminal may communicate with the base station based on Discontinuous Reception (DRX for short). In this case, the configuration information may include a fifth timer, and the terminal may start the fifth timer after sending the uplink new transmission information to the base station. Furthermore, during the running period of the fifth timer, the dynamic scheduling to the uplink blind retransmission from the base station may not be monitored.

The timing duration of the fifth timer may be understood as a time interval for monitoring the dynamic scheduling of blind retransmission. During this time interval, the terminal stops monitoring the dynamic scheduling to uplink blind retransmission from the base station. After the fifth timer expires, i.e., outside this time interval, the dynamic scheduling to the uplink blind retransmission by the base station may be monitored.

The fifth timer may be a discontinuous reception hybrid automatic repeat request round-trip time uplink timer drx-HARQ-RTT-TimerUL, or may be a newly set timer. The general usage of drx-HARQ-RTT-TimerUL is that during the operation of drx-HARQ-RTT-TimerUL, the terminal stops receiving uplink retransmission scheduling information sent by the base station. In this embodiment, drx-HARQ-RTT-TimerUL is used as the fifth timer, which is equivalent to multiplexing drx-HARQ-RTT-TimerUL, so that it is unnecessary to set a new timer, which is beneficial to reduce the signaling consumption of the setting operation.

Figure 11:
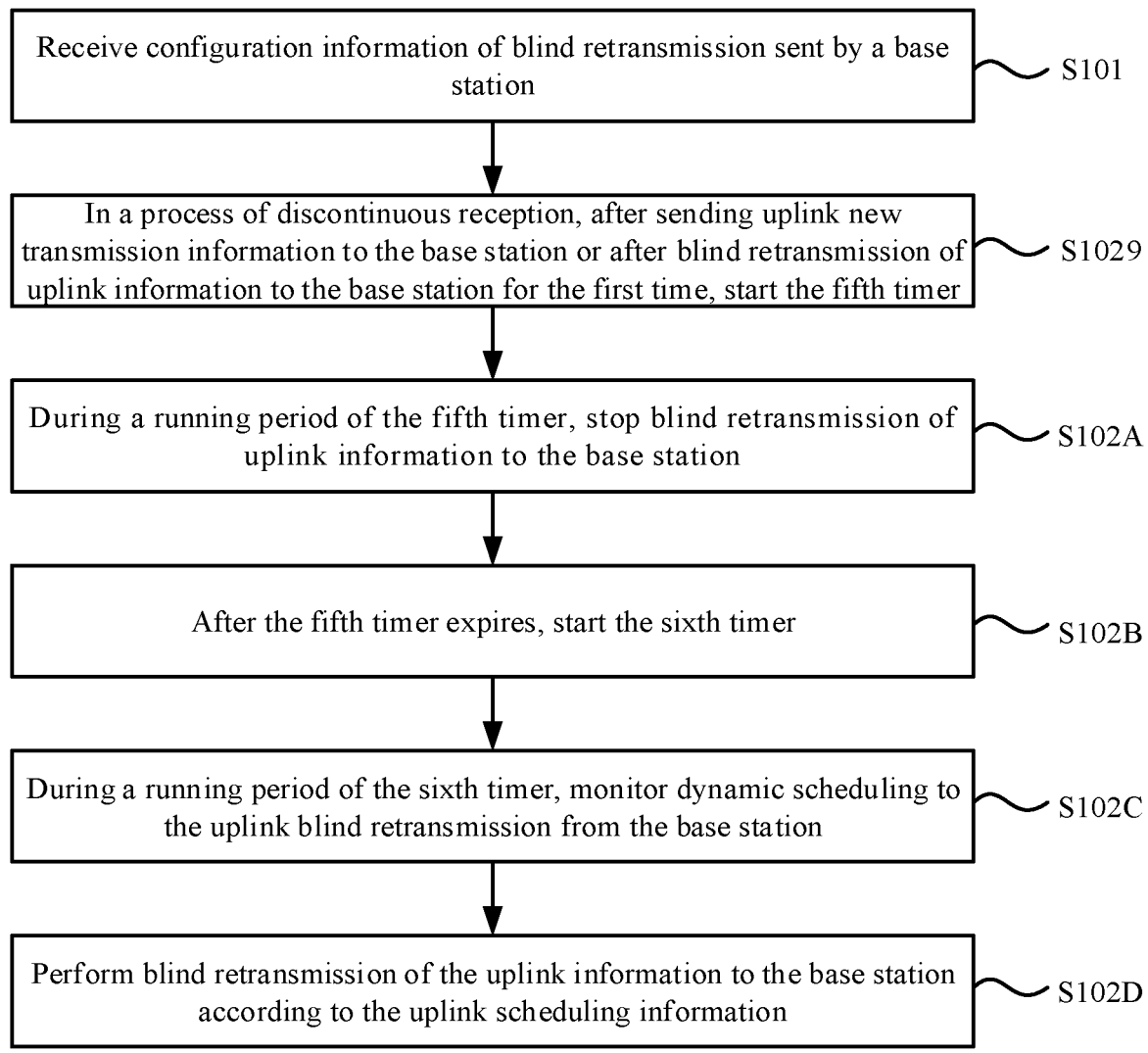
FIG. 11 is a schematic flowchart of yet another blind retransmission method according to an embodiment of the present disclosure.

FIG. 11 is a schematic flowchart of yet another blind retransmission method according to an embodiment of the present disclosure. As shown in FIG. 11, the configuration information further includes a sixth timer, and the performing blind retransmission communication with the base station according to the configuration information further includes the following steps.

In step S102B, after the fifth timer expires, the sixth timer is started.

In step S102C, during a running period of the sixth timer, dynamic scheduling to the uplink blind retransmission from the base station is monitored.

In step S102D, the blind retransmission of uplink information to the base station is performed according to the uplink scheduling information.

In one embodiment, the configuration information may further include a sixth timer, and after the fifth timer expires, the sixth timer may be started. Furthermore, during the running period of the sixth timer, the dynamic scheduling to the uplink blind retransmission from the base station may be monitored, and blind retransmission of uplink information to the base station is performed according to the received dynamic scheduling of the uplink blind retransmission.

The timing duration of the sixth timer may be understood as a time window for receiving the dynamic scheduling of uplink blind retransmission. In this time window, the terminal receives the dynamic scheduling of uplink blind retransmission sent by the base station. After the sixth timer expires, i.e., outside the time window, the terminal stops receiving the dynamic scheduling of uplink blind retransmission sent by the base station.

The sixth timer may be a discontinuous reception uplink retransmission timer drx-RetransmissionTimerUL, or may be a newly set timer. The general use of the DRX uplink retransmission timer is to start when the drx-HARQ-RTT-TimerUL expires. During the operation of the DRX uplink retransmission timer, the terminal may receive uplink retransmission scheduling information of the dynamic scheduling sent by the base station. In this embodiment, the discontinuous reception uplink retransmission timer is used as the sixth timer, which is equivalent to multiplexing the discontinuous reception uplink retransmission timer, so that it is unnecessary to set a new timer, which is conducive to reducing the signaling consumption of the setting operation.

Optionally, the method further includes:
setting the same fifth timer and/or the sixth timer for all blind retransmissions; and/or
for each logical channel and/or for each HARQ process, setting the fifth timer and/or the sixth timer respectively.

In one embodiment, the same fifth timer and/or the sixth timer may be set for all blind retransmissions, or the fifth timer and/or the sixth timer may be set separately for each logical channel, or the fifth timer and/or the sixth timer may also be separately set for each HARQ process. The timers configured for different logical channels may be the same or different, and the timers configured for different HARQ processes may be the same or different.

Optionally, the method further includes:
receiving first duration configuration information for the fifth timer;
determining according to the first duration configuration that an upper limit of a timing duration of the fifth timer is greater than 56 time-domain symbols.

In one embodiment, in the terrestrial network, the terminal and the base station can communicate directly, so the communication delay is small, and the time interval of the uplink retransmission may also be small, for example, the upper limit of the uplink retransmission is indicated by the timing duration of the fifth timer, and the timing duration of the fifth timer is generally equal to 56 time-domain symbols.

In the non-terrestrial network, the terminal and the base station need to communicate through satellite, and the satellite is located in the air, and has a relatively long distance to the terminal and the base station, which leads to a large communication delay, so the time interval of uplink blind retransmission may be relatively large. For example, the time interval of uplink blind retransmission is indicated by the timing duration of the fifth timer, the base station may send first duration configuration information to the terminal to configure that the upper limit of the timing duration of the fifth timer is greater than 56 time-domain symbols, so as to meet the relatively large time interval of uplink blind retransmission. For example, the upper limit of the timing duration of the fifth timer may be 40 slots, that is, 560 time-domain symbols.

Figure 12:
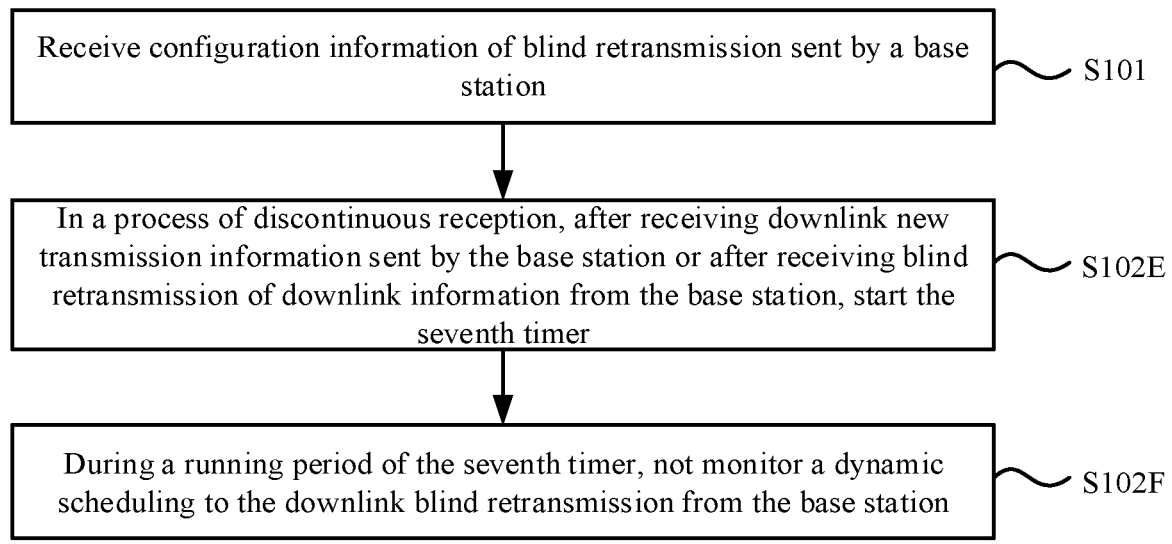
FIG. 12 is a schematic flowchart of yet another blind retransmission method according to an embodiment of the present disclosure.

FIG. 12 is a schematic flowchart of yet another blind retransmission method according to an embodiment of the present disclosure. As shown in FIG. 12, the configuration information includes a seventh timer, and the performing blind retransmission communication with the base station according to the configuration information includes the following steps.

In step S102E, in a process of discontinuous reception, after receiving downlink new transmission information sent by the base station or after receiving blind retransmission of downlink information from the base station, the seventh timer is started.

In step S102F, during a running period of the seventh timer, a dynamic scheduling of the downlink blind retransmission from the base station is not monitored.

In one embodiment, the terminal may communicate with the base station based on discontinuous reception. In this case, the configuration information may include a seventh timer, and the terminal may start the seventh timer after receiving the downlink new transmission information sent by the base station or after reception of blind retransmission of the downlink information from the base station. Furthermore, during the running period of the seventh timer, the dynamic scheduling of the downlink blind retransmission from the base station may not be monitored.

The timing duration of the seventh timer may be understood as a time interval for monitoring the dynamic scheduling of downlink blind retransmission. During this time interval, the terminal stops monitoring the dynamic scheduling of downlink blind retransmission. After the seventh timer expires, i.e. outside the time interval, the terminal may monitor the dynamic scheduling of downlink blind retransmission.

The seventh timer may be a discontinuous reception hybrid automatic repeat request round-trip time downlink timer drx-HARQ-RTT-TimerDL, or a newly set timer. The general use of drx-HARQ-RTT-TimerDL is that during the operation of drx-HARQ-RTT-TimerDL, the terminal stops receiving downlink retransmission scheduling information sent by the base station. In this embodiment, drx-HARQ-RTT-TimerDL is used as the seventh timer, which is equivalent to multiplexing the drx-HARQ-RTT-TimerDL, so that it is not necessary to set a new timer, which is beneficial to reduce the signaling consumption of the setting operation.

Figure 13:
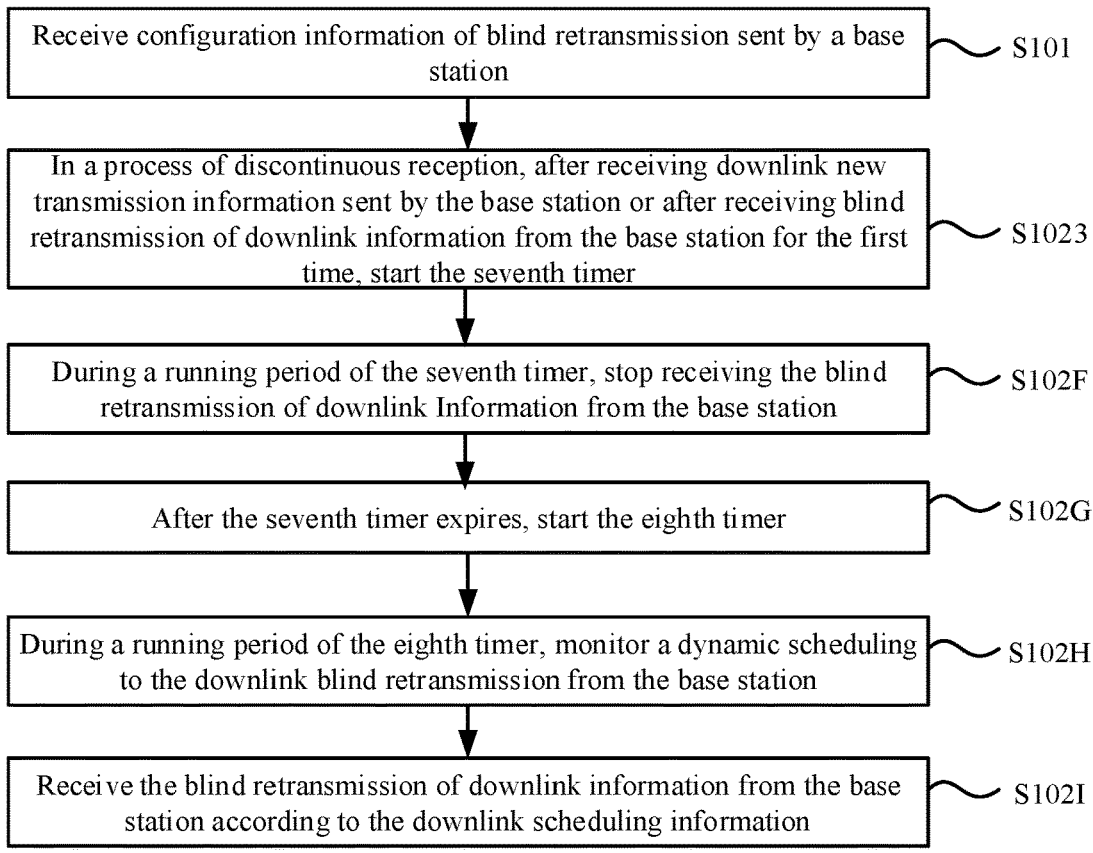
FIG. 13 is a schematic flowchart of yet another blind retransmission method according to an embodiment of the present disclosure.

FIG. 13 is a schematic flowchart of yet another blind retransmission method according to an embodiment of the present disclosure. As shown in FIG. 13, the configuration information further includes an eighth timer, and the performing blind retransmission communication with the base station according to the configuration information further includes the following steps.

In step S102G, after the seventh timer expires, the eighth timer is started.

In step S102H, during a running period of the eighth timer, a dynamic scheduling of the downlink blind retransmission from the base station is monitored.

In step S102I, the blind retransmission of the downlink information from the base station is received according to the downlink scheduling information.

In one embodiment, the configuration information may further include an eighth timer, and after the seventh timer expires, the eighth timer may be started. Furthermore, during the running period of the eighth timer, the dynamic scheduling of the downlink blind retransmission from the base station may be monitored, and the blind retransmission of the downlink information from the base station may be received according to the dynamic scheduling of the downlink blind retransmission.

The timing duration of the eighth timer may be understood as a time window for receiving the dynamic scheduling of downlink blind retransmission. Within this time window, the terminal receives the dynamic scheduling of downlink blind retransmission sent by the base station. After the eighth timer expires, i.e., outside the time window, the terminal stops receiving the dynamic scheduling of downlink blind retransmission sent by the base station.

The eighth timer may be a discontinuous reception downlink retransmission timer drx-RetransmissionTimerDL, or may be a newly set timer. The general use of the DRX downlink retransmission timer is to be started when the drx-HARQ-RTT-TimerUL expires. During the operation of the DRX downlink retransmission timer, the terminal may receive the downlink retransmission scheduling information of dynamic scheduling sent by the base station. In this embodiment, the DRX downlink retransmission timer is used as the eighth timer, which is equivalent to multiplexing the DRX downlink retransmission timer, so that it is not necessary to set a new timer, which is beneficial to reduce the signaling consumption of setting operation.

Optionally, the method further includes:
setting the same seventh timer and/or the eighth timer for all blind retransmissions; and/or
setting the seventh timer and/or the eighth timer respectively for each logical channel and/or for each HARQ process.

In one embodiment, the same seventh timer and/or the eighth timer may be set for all blind retransmissions, or the seventh timer and/or the eighth timer may be set separately for each logical channel, or the seventh timer and/or the eighth timer may also be set separately for each HARQ process. The timers configured for different logical channels may be the same or different, and the timers configured for different HARQ processes may be the same or different.

Optionally, the start moment of the seventh timer is the first orthogonal frequency division multiplexing time-domain symbol after a physical uplink control channel or a physical uplink shared channel corresponding to receiving the downlink new transmission information sent by the base station or after receiving the blind retransmission of downlink information from the base station.

In one embodiment, the seventh timer may be started at the first OFDM time-domain symbol after a physical uplink control channel corresponding to sending the uplink new transmission information to the base station, or the seventh timer may be started at the first OFDM time-domain symbol after a physical uplink shared channel corresponding to sending the uplink new transmission information to the base station, or the seventh timer may be started at the first OFDM time-domain symbol after a physical uplink control channel corresponding to performing blind retransmission of the uplink information to the base station for the first time, or the seventh timer may be started at the first OFDM time-domain symbol after a physical uplink shared channel corresponding to performing blind retransmission of the uplink information to the base station for the first time.

Optionally, the start moment of the seventh timer is the first orthogonal frequency division multiplexing time-domain symbol after the first repetition in receiving the downlink new transmission information sent by the base station or after the first repetition in reception of blind retransmission of the downlink information from the base station.

In one embodiment, the uplink new transmission information or uplink information of the first blind retransmission may include a plurality of repetitions, specifically, a plurality of repeated transmission processes.

The seventh timer may be started at the first OFDM time-domain symbol after the first repetition in sending the uplink new transmission information to the base station, or the seventh timer may be started at the first OFDM time-domain symbol after the first repetition in performing blind retransmission of uplink information to the base station.

Optionally, the method further includes:
receiving second duration configuration information for the seventh timer;
determining according to the second duration configuration that an upper limit of a timing duration of the seventh timer is greater than 56 time-domain symbols.

In one embodiment, in the terrestrial network, the terminal and the base station can communicate directly, so the communication delay is small, and the time interval of downlink retransmission may also be small, for example, the timing duration of the seventh timer indicates the time interval of the downlink retransmission, and the upper limit of the timing duration of the seventh timer is generally equal to 56 time-domain symbols.

In the non-terrestrial network, the terminal and the base station need to communicate through satellite, and the satellite is located in the air, and has a long distance to the terminal and the base station, resulting in a large communication delay, so the time interval of downlink blind retransmission may be relatively large. For example, the time interval of the downlink blind retransmission is represented by the timing duration of the fifth timer, and the base station may send the second duration configuration information to the terminal to configure the upper limit of the timing duration of the fifth timer to be greater than 56 time-domain symbols, so as to meet the needs of larger time interval of downlink blind retransmission. For example, the upper limit of the timing duration of the fifth timer may be 40 slots, that is, 560 time-domain symbols.

Figure 14:
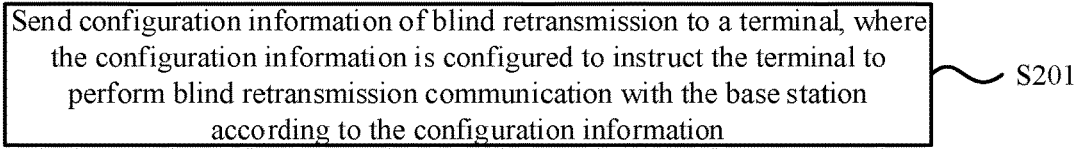
FIG. 14 is a schematic flowchart of a blind retransmission indication method according to an embodiment of the present disclosure.

FIG. 14 is a schematic flowchart of a method for indicating blind retransmission according to an embodiment of the present disclosure. The blind retransmission indication method shown in this embodiment may be applicable to the base station, and the base station includes, but is not limited to, base stations in communication systems such as 4G base stations, 5G base stations, and 6G base stations. The base station may communicate with a terminal that is a user equipment, and the terminal includes, but is not limited to, electronic devices such as mobile phones, tablet computers, wearable devices, sensors, and Internet of Things devices. In one embodiment, the terminal may be a terminal to which the blind retransmission indication method described in any of the foregoing embodiments is applicable.

As shown in FIG. 14, the blind retransmission indication method may include the following steps.

In step S201, configuration information of blind retransmission is sent to a terminal, where the configuration information is configured to instruct the terminal to perform blind retransmission communication with the base station according to the configuration information.

In one embodiment, the base station may send configuration information of blind retransmission to the terminal, where the configuration information includes, but is not limited to, a time interval of blind retransmission, the number of blind retransmissions, a time window of blind retransmission, and the like. The terminal may perform blind retransmission communication with the base station according to the configuration information, for example, performing blind retransmission of uplink information to the base station, for another example, receiving blind retransmission of downlink information from the base station.

It should be noted that the blind retransmission in all embodiments of the present disclosure may be understood as an operation of retransmitting information to the receiving end automatically performed by the sending end when no hybrid automatic repeat request feedback from the receiving end is received.

According to the embodiments of the present disclosure, the terminal may perform blind retransmission communication with the base station according to the configuration information, so that even if the receiving end is prohibited from sending HARQ feedback to the sending end, the sending end can perform blind retransmission of information, which is beneficial to ensure that the receiving end in the communication process receives the information sent by the sending end, thereby enabling the subsequent communication process to proceed smoothly.

Figure 15:
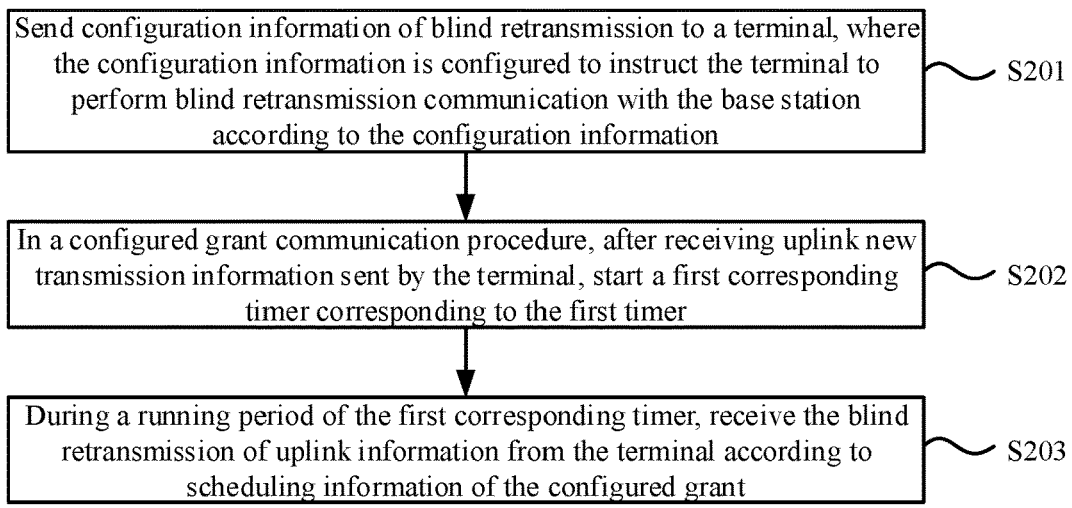
FIG. 15 is a schematic flowchart of another blind retransmission indication method according to an embodiment of the present disclosure.

FIG. 15 is a schematic flowchart of another blind retransmission indication method according to an embodiment of the present disclosure. As shown in FIG. 15, the configuration information includes a first timer, and the method further includes the following steps In step S202, in a configured grant communication procedure, after receiving uplink new transmission information sent by the terminal, a first corresponding timer corresponding to the first timer is started.

In step S203, during a running period of the first corresponding timer, the blind retransmission of uplink information from the terminal is received according to scheduling information of the configured grant.

In one embodiment, the timing duration of the first corresponding timer may be the same as the timing duration of the first timer.

The base station may perform uplink communication with the terminal based on the configured grant. In this case, the configuration information may include a first timer, and the terminal may start the first timer after sending the uplink new transmission information to the base station. Furthermore, during the operation of the first timer, the blind retransmission of uplink information to the base station may be performed according to the scheduling information of the configured grant, and during the operation of the first timer, the uplink new transmission information is not sent to the base station.

After receiving the uplink new transmission information sent by the terminal, the base station may start a first corresponding timer, and then, during the running period of the first corresponding timer, the base station receives the blind retransmission of uplink information from the terminal according to the scheduling information of the configured grant.

Figure 16:
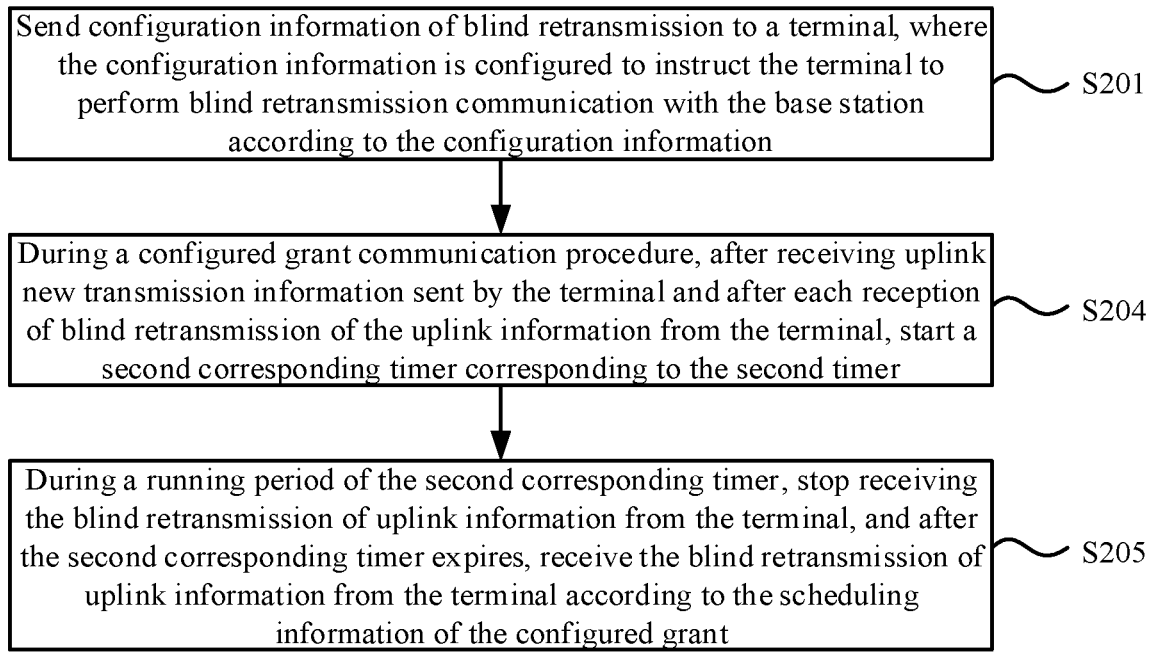
FIG. 16 is a schematic flowchart of yet another blind retransmission indication method according to an embodiment of the present disclosure.

FIG. 16 is a schematic flowchart of yet another blind retransmission indication method according to an embodiment of the present disclosure. As shown in FIG. 16, the configuration information includes a second timer, and the method further includes the following steps.

In step S204, during a configured grant communication procedure, after receiving uplink new transmission information sent by the terminal and after each reception of blind retransmission of the uplink information from the terminal, a second corresponding timer corresponding to the second timer is started.

In step S205, during a running period of the second corresponding timer, receiving the blind retransmission of the uplink information from the terminal is stopped, and after the second corresponding timer expires, the blind retransmission of uplink information from the terminal is received according to the scheduling information of the configured grant.

In one embodiment, the timing duration of the second corresponding timer may be the same as the timing duration of the second timer.

The base station may perform uplink communication with the terminal based on the configured grant. In this case, the configuration information may include a second timer. After the terminal sends the uplink new transmission information to the base station and after each blind retransmission of the uplink information to the base station, the second timer may be started. Furthermore, during the running period of the second timer, the blind retransmission of uplink information to the base station may be stopped; and after the second timer expires, the blind retransmission of uplink information to the base station may be performed according to the scheduling information of the configured grant.

The base station may start a second corresponding timer after receiving the uplink new transmission information sent by the terminal and after each reception of blind retransmission of the uplink information from the terminal; and then during the running period of the second corresponding timer, the base station stops receiving the blind retransmission of the uplink information from the terminal, and after the second corresponding timer expires, the base station receives the blind retransmission of uplink information from the terminal according to the scheduling information of the configured grant.

Figure 17:
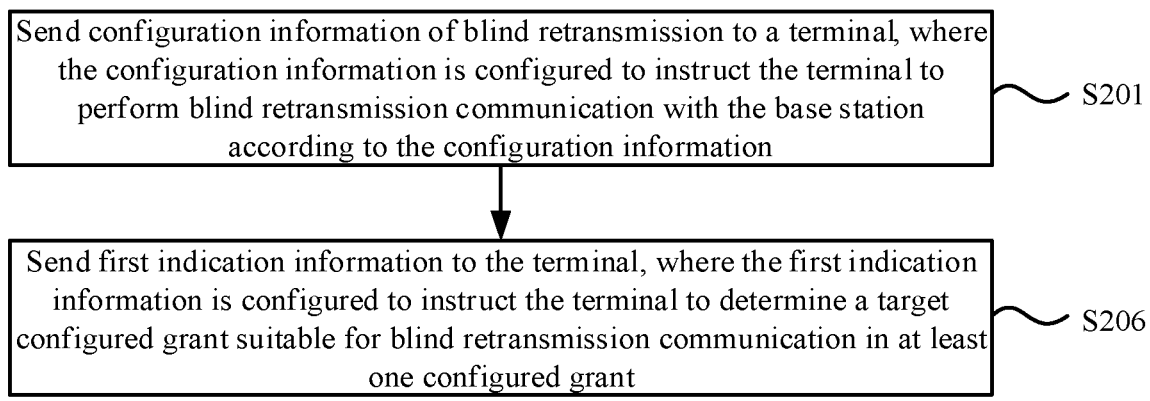
FIG. 17 is a schematic flowchart of yet another blind retransmission indication method according to an embodiment of the present disclosure.

FIG. 17 is a schematic flowchart of yet another blind retransmission indication method according to an embodiment of the present disclosure. As shown in FIG. 17, the method further includes the following steps.

In step S206, first indication information is sent to the terminal, where the first indication information is used for instructing the terminal to determine a target configured grant suitable for blind retransmission communication in at least one configured grant.

In one embodiment, the base station may pre-configure at least one configured grant for the terminal, so that the terminal stores scheduling information of at least one configured grant, and then the base station may send first indication information to the terminal to instruct the terminal to select which configured grant to use, for example, the indicated configured grant is the target configured grant.

Figure 18:
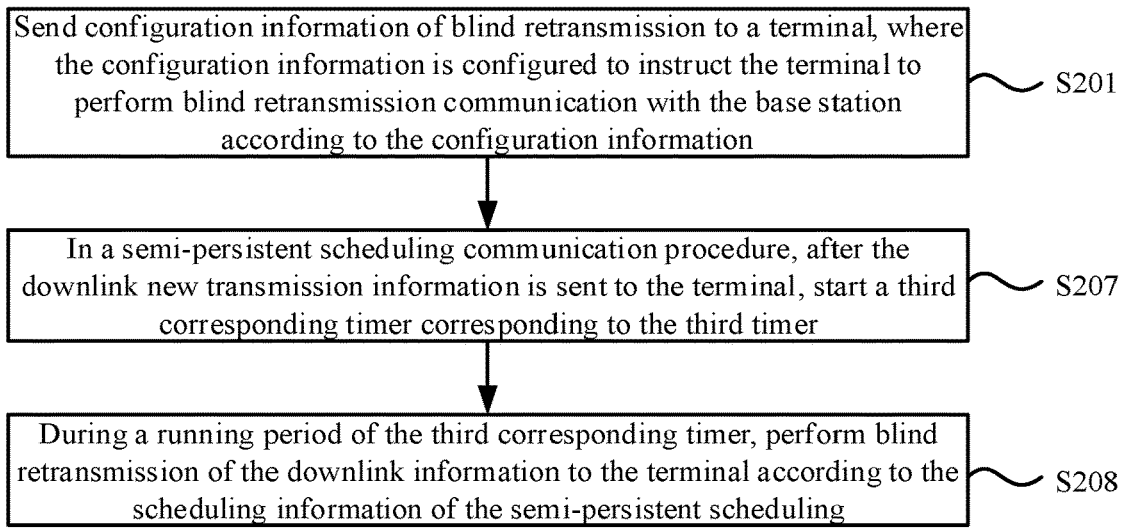
FIG. 18 is a schematic flowchart of yet another blind retransmission indication method according to an embodiment of the present disclosure.

FIG. 18 is a schematic flowchart of yet another blind retransmission indication method according to an embodiment of the present disclosure. As shown in FIG. 18, the configuration information includes a third timer, and the method further includes the following steps.

In step S207, in a semi-persistent scheduling communication procedure, after the downlink new transmission information is sent to the terminal, a third corresponding timer corresponding to the third timer is started.

In step S208, during a running period of the third corresponding timer, the blind retransmission of downlink information to the terminal is performed according to the scheduling information of the semi-persistent scheduling.

In one embodiment, the timing duration of the third corresponding timer may be the same as the timing duration of the third timer.

The base station may perform downlink communication with the terminal based on semi-persistent scheduling. In this case, the configuration information may include a third timer, and the terminal may start the third timer after receiving the downlink new transmission information sent by the base station. Furthermore, during the operation of the third timer, the blind retransmission of the downlink information from the base station may be received according to the scheduling information of the semi-persistent scheduling, that is, during the operation of the third timer, the terminal determines the downlink information received from the base station as the downlink information of blind retransmission. After the third timer expires, the terminal may determine the downlink information received from the base station as newly transmitted downlink information.

After the base station sends the downlink new transmission information to the terminal, it may start a third corresponding timer; then during the running period of the third corresponding timer, the blind retransmission of downlink information to the terminal is performed according to the scheduling information of semi-persistent scheduling.

Figure 19:
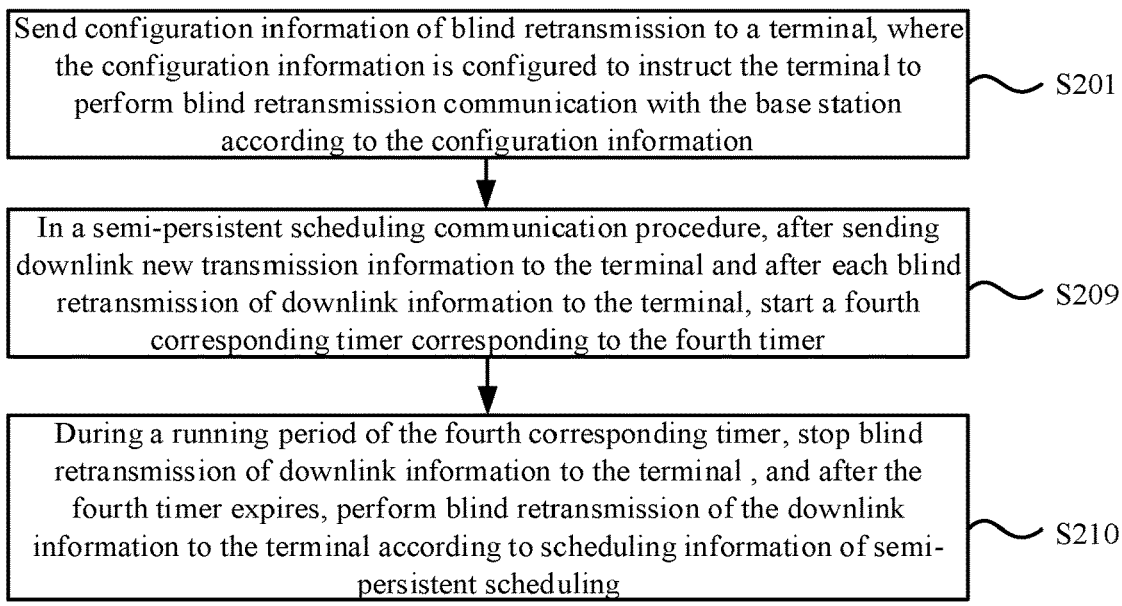
FIG. 19 is a schematic flowchart of yet another blind retransmission indication method according to an embodiment of the present disclosure.

FIG. 19 is a schematic flowchart of yet another blind retransmission indication method according to an embodiment of the present disclosure. As shown in FIG. 19, the configuration information includes a fourth timer, and the method further includes the following steps.

In step S209, in a semi-persistent scheduling communication procedure, after sending downlink new transmission information to the terminal and after each blind retransmission of downlink information to the terminal, a fourth corresponding timer corresponding to the fourth timer is started.

In step S210, during a running period of the fourth corresponding timer, the blind retransmission of downlink information to the terminal is stopped, and after the fourth timer expires, the blind retransmission of downlink information to the terminal is performed according to scheduling information of semi-persistent scheduling.

In one embodiment, the timing duration of the fourth corresponding timer may be the same as the timing duration of the fourth timer.

The base station may perform downlink communication with the terminal based on semi-persistent scheduling. In this case, the configuration information may include a fourth timer. After the terminal receives the downlink new transmission information sent by the base station and after the terminal receives each blind retransmission of downlink information from the base station, the fourth timer may be started. Furthermore, during the running period of the fourth timer, the newly transmitted downlink information sent by the base station may be received, that is, the terminal determines that the downlink information sent by the base station that is received according to the scheduling information of semi-persistent scheduling is not the downlink information of blind retransmission; and after the fourth timer expires, the blind retransmission of the downlink information from the base station may be received, that is, the terminal determines the downlink information sent by the base station that is received according to the scheduling information of semi-persistent scheduling as the downlink information of blind retransmission.

The base station may start a fourth corresponding timer after sending downlink new transmission information to the terminal and after each blind retransmission of downlink information to the terminal; and during the running period of the fourth corresponding timer, the blind retransmission of the downlink information to the terminal is stopped, and after the fourth timer expires, the blind retransmission of downlink information to the terminal is performed according to the scheduling information of the semi-persistent scheduling.

Figure 20:
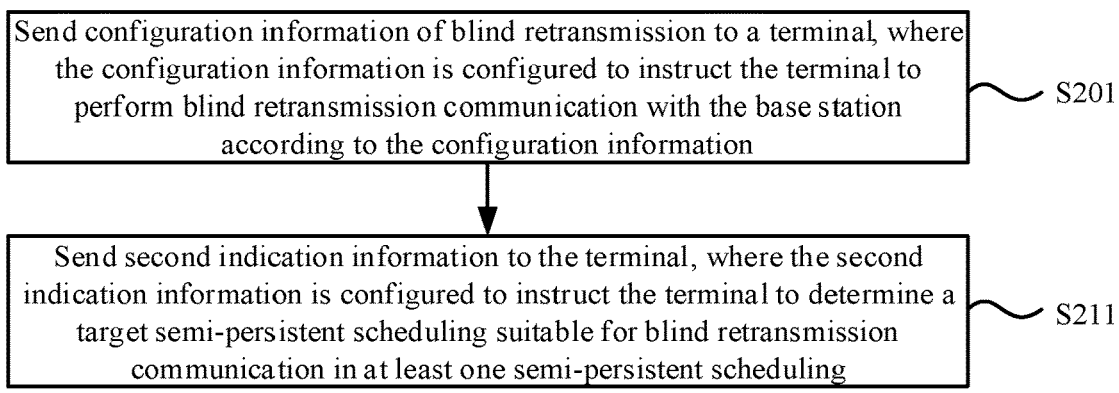
FIG. 20 is a schematic flowchart of yet another blind retransmission indication method according to an embodiment of the present disclosure.

FIG. 20 is a schematic flowchart of yet another blind retransmission indication method according to an embodiment of the present disclosure. As shown in FIG. 20, the method further includes the following steps.

In step S211, second indication information is sent to the terminal, where the second indication information is used for instructing the terminal to determine a target semi-persistent scheduling suitable for blind retransmission communication in at least one semi-persistent scheduling.

In one embodiment, the base station may pre-configure at least one semi-persistent scheduling for the terminal, so that the terminal stores scheduling information of at least one semi-persistent scheduling, and then the base station may send second indication information to the terminal to instruct the terminal which semi-persistent scheduling to select, for example, the indicated semi-persistent scheduling is the target semi-persistent scheduling.

Figure 21:
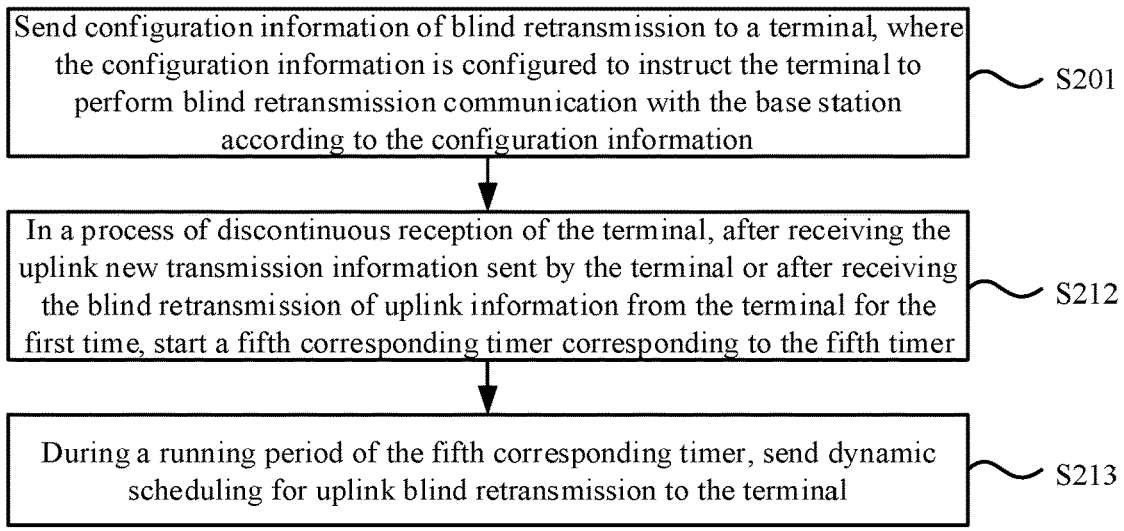
FIG. 21 is a schematic flowchart of yet another blind retransmission indication method according to an embodiment of the present disclosure.

FIG. 21 is a schematic flowchart of yet another blind retransmission indication method according to an embodiment of the present disclosure. As shown in FIG. 21, the configuration information includes a fifth timer, and the method further includes the following steps.

In step S212, in a process of discontinuous reception of the terminal, after receiving the uplink new transmission information sent by the terminal or after receiving the uplink information of the first blind retransmission of the terminal, a fifth corresponding timer corresponding to the fifth timer is started.

In step S213, during a running period of the fifth corresponding timer, dynamic scheduling for uplink blind retransmission is sent to the terminal.

In one embodiment, the timing duration of the fifth corresponding timer may be the same as the timing duration of the fifth timer.

The terminal may communicate with the base station based on discontinuous reception. In this case, the configuration information may include a fifth timer, and the terminal may start the fifth timer after sending the uplink new transmission information to the base station. Furthermore, during the running period of the fifth timer, blind retransmission of uplink information to the base station may be stopped.

During the discontinuous reception of the terminal, the base station may start a fifth corresponding timer after receiving the uplink new transmission information sent by the terminal or after receiving the blind retransmission of the uplink information from the terminal for the first time; during the running period of the fifth corresponding timer, receiving the blind retransmission of the uplink information from the terminal is stopped.

Figure 22:
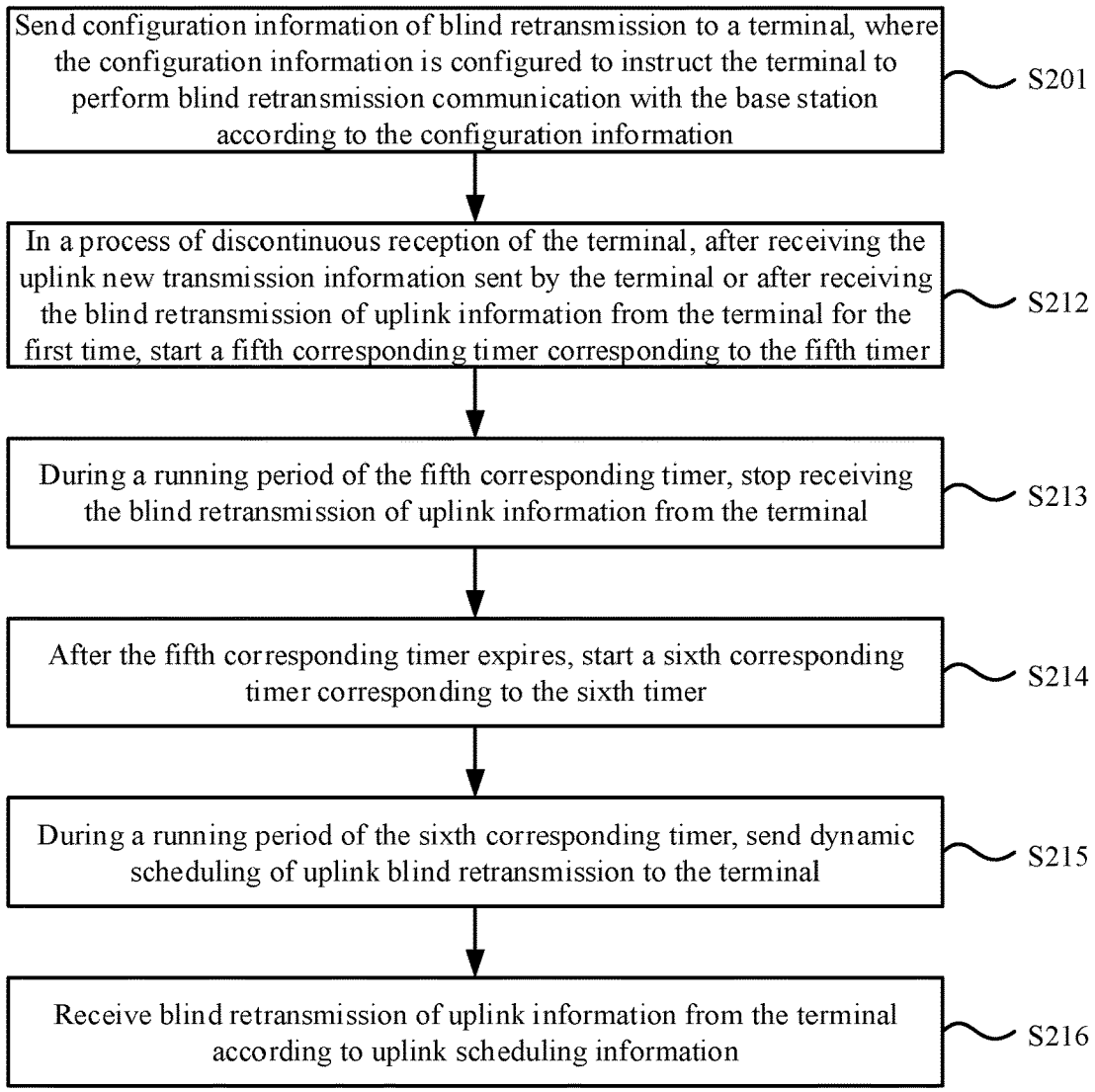
FIG. 22 is a schematic flowchart of yet another blind retransmission indication method according to an embodiment of the present disclosure.

FIG. 22 is a schematic flowchart of yet another method for blind retransmission indication according to an embodiment of the present disclosure. As shown in FIG. 22, the configuration information further includes a sixth timer, and the method further includes the following steps.

In step S214, after the fifth corresponding timer expires, a sixth corresponding timer corresponding to the sixth timer is started.

In step S215, during a running period of the sixth corresponding timer, dynamic scheduling of uplink blind retransmission is sent to the terminal.

In step S216, blind retransmission of uplink information from the terminal is received according to uplink scheduling information.

In one embodiment, the timing duration of the sixth corresponding timer may be the same as the timing duration of the sixth timer.

The configuration information may further include a sixth timer, and after the fifth timer expires, the sixth timer may be started. Furthermore, during the running period of the sixth timer, uplink scheduling information of the dynamic scheduling sent by the base station may be received, and the blind retransmission of uplink information to the base station may be performed according to the received uplink scheduling information.

After the fifth corresponding timer expires, the base station may start a sixth corresponding timer; during the running period of the sixth corresponding timer, uplink scheduling information of dynamic scheduling is sent to the terminal; and then according to the uplink scheduling information, blind retransmission of uplink information from the terminal is received.

Optionally, the method further includes:

sending first duration configuration information of the fifth timer to the terminal, where the first duration configuration information is configured to indicate that an upper limit of a timing duration of the fifth timer is configured to be greater than 56 time-domain symbols.

In an embodiment, in the terrestrial network, the terminal and the base station can communicate directly, so the communication delay is small, and the time interval of the uplink retransmission may also be small, for example, the timing duration of the fifth timer indicates the time interval of the uplink retransmission, and the upper limit of the timing duration of the fifth timer is generally equal to 56 time-domain symbols.

In the non-terrestrial network, the terminal and the base station need to communicate through satellite, and the satellite is located in the air, and has a relatively long distance to the terminal and the base station, which leads to a large communication delay, so the time interval of uplink blind retransmission may be relatively large. For example, the timing duration of the fifth timer indicates the time interval of uplink blind retransmission. The base station may send the first duration configuration information to the terminal to configure the upper limit of the timing duration of the fifth timer to be greater than 56 time-domain symbols, so as to meet a relatively large time interval of uplink blind retransmission For example, the upper limit of the timing duration of the fifth timer may be 40 slots, that is, 560 time-domain symbols.

Figure 23:
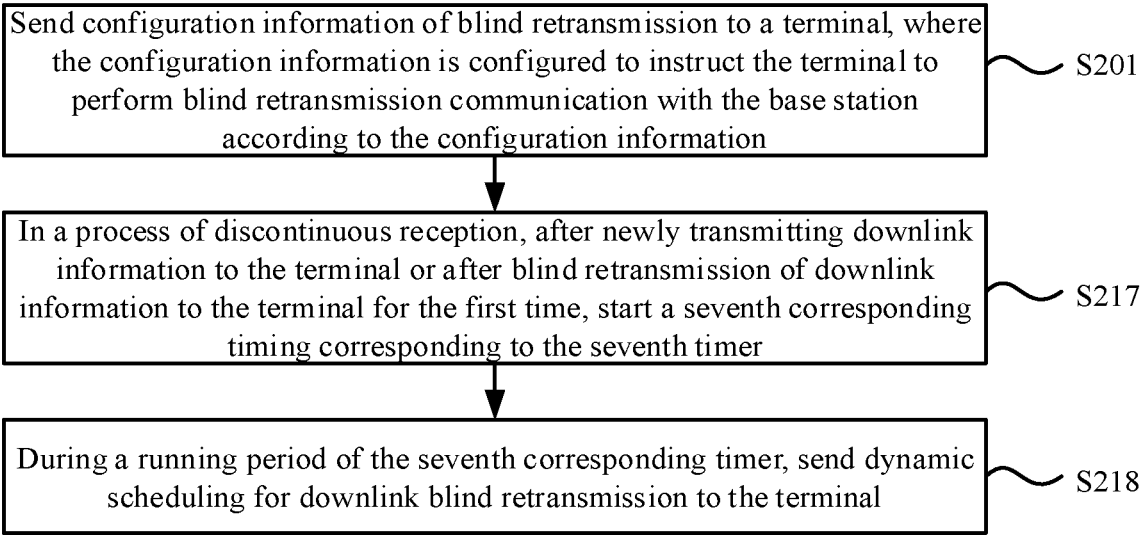
FIG. 23 is a schematic flowchart of yet another blind retransmission indication method according to an embodiment of the present disclosure.

FIG. 23 is a schematic flowchart of yet another blind retransmission indication method according to an embodiment of the present disclosure. As shown in FIG. 23, the configuration information includes a seventh timer, and the method further includes the following steps.

In step S217, in a process of discontinuous reception, after newly transmitting downlink information to the terminal or after the blind retransmission of downlink information to the terminal for the first time, a seventh corresponding timing corresponding to the seventh timer is started.

In step S218, during a running period of the seventh corresponding timer, dynamic scheduling for downlink blind retransmission is sent to the terminal.

In one embodiment, the timing duration of the seventh corresponding timer and the timing duration of the seventh timer may be the same.

The terminal may communicate with the base station based on discontinuous reception. In this case, the configuration information may include a seventh timer, and the terminal may start the seventh timer after receiving the downlink new transmission information sent by the base station or after receiving the blind retransmission of the downlink information from the base station. Furthermore, during the running period of the seventh timer, the blind retransmission of the downlink information from the base station may be stopped.

In the process of discontinuous reception, the base station may start a seventh corresponding timer after transmitting new downlink information to the terminal or after the blind retransmission of downlink information to the terminal for the first time; and then during operation of the seventh corresponding timer, blind retransmission of downlink information to the terminal is stopped.

Figure 24:
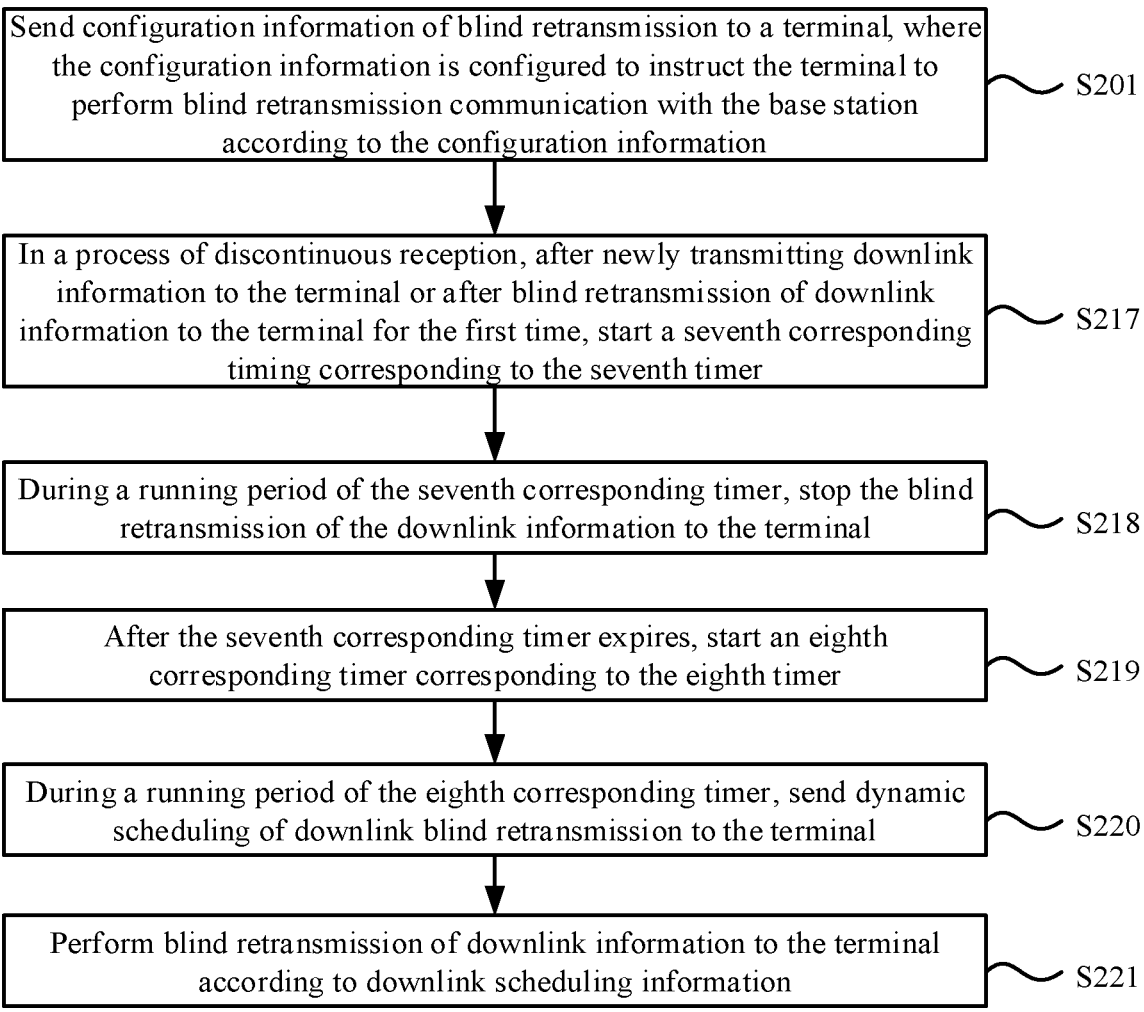
FIG. 24 is a schematic flowchart of yet another blind retransmission indication method according to an embodiment of the present disclosure.

FIG. 24 is a schematic flowchart of yet another blind retransmission indication method according to an embodiment of the present disclosure. As shown in FIG. 24, the configuration information further includes an eighth timer, and the method further includes the following steps.

In step S219, after the seventh corresponding timer expires, an eighth corresponding timer corresponding to the eighth timer is started.

In step S220, during a running period of the eighth corresponding timer, dynamic scheduling of downlink blind retransmission is sent to the terminal.

In step S221, blind retransmission of downlink information to the terminal is performed according to downlink scheduling information.

In one embodiment, the timing duration of the eighth corresponding timer may be the same as the timing duration of the eighth timer.

The configuration information may further include an eighth timer, and after the seventh timer expires, the eighth timer may be started. Furthermore, during the running period of the eighth timer, the downlink scheduling information of dynamic scheduling sent by the base station may be received, and the blind retransmission of the downlink information from the base station may be received according to the received downlink scheduling information.

After the seventh corresponding timer expires, the base station may start an eighth corresponding timer; during the running period of the eighth corresponding timer, downlink scheduling information of the dynamic scheduling is sent to the terminal; and then according to the downlink scheduling information, blind retransmission of downlink information to the terminal is performed.

Optionally, the method further includes:
sending second duration configuration information for the seventh timer to the terminal, where the second duration configuration information is configured to indicate that the upper limit of the timing duration of the seventh timer is configured to be greater than 56 time-domain symbols.

In one embodiment, in the terrestrial network, the terminal and the base station can communicate directly, so the communication delay is small, and the time interval of downlink retransmission may also be small, for example, the timing duration of the fifth timer indicates the time interval of downlink retransmission, and the upper limit of the timing duration of the fifth timer is generally equal to 56 time-domain symbols.

In the non-terrestrial network, the terminal and the base station need to communicate through satellite, and the satellite is located in the air, and has a long distance to the terminal and the base station, resulting in a large communication delay, so the time interval of downlink blind retransmission may be relatively large. For example, the time interval of the downlink blind retransmission is represented by the timing duration of the fifth timer, and the base station may send the second duration configuration information to the terminal to configure the upper limit of the timing duration of the fifth timer to be greater than 56 time-domain symbols, so as to meet the needs of relatively large time interval for downlink blind retransmission. For example, the upper limit of the timing duration of the fifth timer may be 40 slots, that is, 560 time-domain symbols.

Corresponding to the foregoing embodiments of the blind retransmission method and the blind retransmission indication method, the present disclosure also provides embodiments of a blind retransmission apparatus and a blind retransmission indication apparatus.

Figure 25:
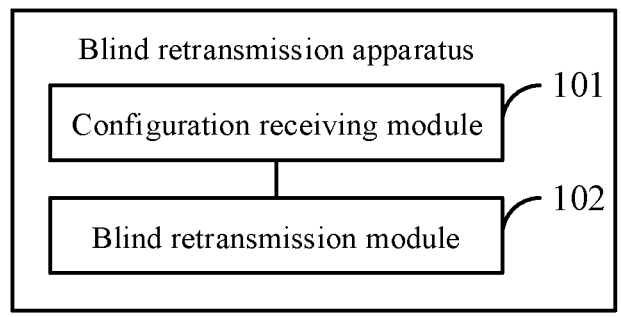
FIG. 25 is a schematic block diagram of a blind retransmission apparatus according to an embodiment of the present disclosure.

FIG. 25 is a schematic block diagram of a blind retransmission apparatus according to an embodiment of the present disclosure. The blind retransmission apparatus shown in this embodiment may be applicable to a terminal, and the terminal includes, but is not limited to, electronic devices such as mobile phones, tablet computers, wearable devices, sensors, and Internet of Things devices. The terminal may communicate with a base station as a user equipment, and the base station includes, but is not limited to, base stations in communication systems such as a 4G base station, a 5G base station, and a 6G base station. In one embodiment, the base station may be a base station to which the blind retransmission indication apparatus described in any of the following embodiments is applicable.

As shown in FIG. 25, the apparatus includes:
a configuration receiving module 101, configured to receive configuration information of blind retransmission sent by the base station;
a blind retransmission module 102, configured to perform blind retransmission communication with the base station according to the configuration information.

Optionally, the configuration information includes a first timer, and the blind retransmission module is configured to: start the first timer after sending uplink new transmission information to the base station during a configured grant communication procedure; during a running period of the first timer, perform blind retransmission of uplink information to the base station according to scheduling information of the configured grant.

Optionally, the configuration information includes a second timer, and the blind retransmission module is configured to, during the configured grant communication procedure, after sending uplink new transmission information to the base station and after each blind retransmission of uplink information to the base station, start the second timer; during a running period of the second timer, stop the blind retransmission of the uplink information to the base station, and after the second timer expires, perform blind retransmission of the uplink information to the base station according to scheduling information of the configured grant.

Optionally, an identifier of a hybrid automatic repeat request process used for blind retransmission of uplink information to the base station is determined according to uplink time of blind retransmission of uplink information to the base station.

Optionally, the apparatus further includes:
a first indication receiving module, configured to receive first indication information sent by the base station;
a first determining module, configured to determine, according to the first indication information, a target configured grant suitable for blind retransmission communication in at least one configured grant.

Optionally, the apparatus further includes:
a first process determining module, configured to, in at least one HARQ process, determine a blind retransmission HARQ process available for the target configured grant according to an offset and/or the number of identifiers of HARQs used for blind retransmission.

Optionally, the configuration information includes a third timer, and the blind retransmission module is configured to start the first timer after receiving downlink new transmission information sent by the base station during a semi-persistent scheduling communication procedure; during a running period of the third timer, determine that the received downlink information sent by the base station is downlink information of blind retransmission.

Optionally, the configuration information includes a fourth timer, and the blind retransmission module is configured to, in the semi-persistent scheduling communication procedure, after receiving the downlink new transmission information sent by the base station and after each reception of blind retransmission of the downlink information from the base station, start the fourth timer; during a running period of the fourth timer, stop receiving the blind retransmission of the downlink information from the base station, and after the fourth timer expires, receive the blind retransmission of the downlink information from the base station.

Optionally, the apparatus further includes:
a second indication receiving module, configured to receive second indication information sent by the base station;
a second determining module, configured to determine, according to the second indication information, a target semi-persistent scheduling suitable for blind retransmission communication in at least one semi-persistent scheduling.

Optionally, the apparatus further includes:
a second process determining module, configured to, in at least one HARQ process, determine a blind retransmission HARQ process available for the target semi-persistent scheduling according to the offset and/or the number of HARQ identifiers used for blind retransmission.

Optionally, the configuration information includes a fifth timer, and the blind retransmission module is configured to, in the process of discontinuous reception, after sending the uplink new transmission information to the base station or after the blind retransmission of uplink information to the base station for the first time, start the fifth timer; during a running period of the fifth timer, not monitor dynamic scheduling to uplink blind retransmission from the base station.

Optionally, the configuration information further includes a sixth timer, and the blind retransmission module is configured to start the sixth timer after the fifth timer expires; during operation of the sixth timer, monitor the dynamic scheduling to the uplink blind retransmission from the base station.

Optionally, the apparatus further includes:
a first timer setting module, configured to set the same fifth timer and/or the sixth timer for all blind retransmissions; and/or for each logical channel and/or for each HARQ process, set the fifth timer and/or the sixth timer respectively.

Optionally, the start moment of the fifth timer is the first orthogonal frequency division multiplexing time-domain symbol after a physical uplink control channel or a physical uplink shared channel corresponding to sending the uplink new transmission information to the base station or performing blind retransmission of the uplink information to the base station for the first time.

Optionally, the start moment of the fifth timer is the first orthogonal frequency division multiplexing time-domain symbol after a first repetition in sending the uplink new transmission information to the base station or after a first repetition in the blind retransmission of the uplink information to the base station for the first time.

Optionally, the apparatus further includes:
a first duration receiving module, configured to receive first duration configuration information for the fifth timer;
a first duration determining module, configured to determine, according to the first duration configuration, that an upper limit of the timing duration of the fifth timer is greater than 56 time-domain symbols.

Optionally, the configuration information includes a seventh timer, and the blind retransmission module is configured to, in the process of discontinuous reception, after receiving the downlink new transmission information sent by the base station or after receiving the blind retransmission of the downlink information from the base station, start the seventh timer; during a running period of the seventh timer, not monitor a dynamic scheduling to the downlink blind retransmission from the base station.

Optionally, the configuration information further includes an eighth timer, and the blind retransmission module is configured to start the eighth timer after the seventh timer expires; during operation of the eighth timer, monitor the dynamic scheduling to the downlink blind retransmission from the base station.

Optionally, the apparatus further includes:
  a second timer setting module, configured to set the same seventh timer and/or the eighth timer for all blind retransmissions; and/or for each logical channel and/or for each HARQ process, set the seventh timer and/or the eighth timer respectively.

Optionally, a start moment of the seventh timer is the first orthogonal frequency division multiplexing time-domain symbol after a physical uplink control channel or a physical uplink shared channel corresponding to receiving the downlink new transmission information sent by the base station or after receiving the blind retransmission of the downlink information from the base station.

Optionally, the start moment of the seventh timer is the first orthogonal frequency division multiplexing time-domain symbol after a first repetition of receiving the downlink new transmission information sent by the base station or after a first repetition of receiving the blind retransmission of the downlink information from the base station.

Optionally, the apparatus further includes:
  a second duration receiving module, configured to receive second duration configuration information for the seventh timer;
  a second duration determining module, configured to determine, according to the second duration configuration, that an upper limit of a timing duration of the seventh timer is greater than 56 time-domain symbols.

Figure 26:
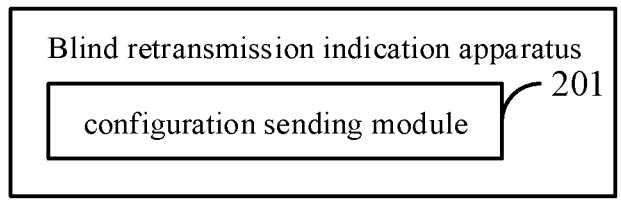
FIG. 26 is a schematic block diagram of a blind retransmission indication apparatus according to an embodiment of the present disclosure.

FIG. 26 is a schematic block diagram of a blind retransmission indication apparatus according to an embodiment of the present disclosure. The blind retransmission indication apparatus shown in this embodiment may be applicable to base stations, and the base stations include but are not limited to base stations in communication systems such as 4G base stations, 5G base stations, and 6G base stations. The base station may communicate with a terminal that is a user equipment, and the terminal includes but is not limited to electronic devices such as mobile phones, tablet computers, wearable devices, sensors, and Internet of Things devices. In one embodiment, the terminal may be a terminal to which the blind retransmission indication apparatus described in any of the foregoing embodiments is applicable.

As shown in FIG. 26, the apparatus includes:
  a configuration sending module 201, configured to send configuration information of blind retransmission to a terminal, where the configuration information is configured to instruct the terminal to perform blind retransmission communication with the base station according to the configuration information.

Optionally, the configuration information includes a first timer, and the apparatus further includes:
  a first starting module, configured to start a first corresponding timer corresponding to the first timer after receiving uplink new transmission information sent by the terminal during a configured grant communication procedure;
  a first receiving module, configured to receive blind retransmission of uplink information from the terminal according to scheduling information of the configured grant during a running period of the first corresponding timer.

Optionally, the configuration information includes a second timer, and the apparatus further includes:
  a second starting module, configured to start a second corresponding timer corresponding to the second timer after receiving the uplink new transmission information sent by the terminal and after each reception of blind retransmission of the uplink information from the terminal during the configured grant communication procedure;
  a second receiving module, configured to stop receiving the blind retransmission of the uplink information from the terminal during a running period of the second corresponding timer, and after the second corresponding timer expires, receive the blind retransmission of uplink information from the terminal according to scheduling information of the configured grant.

Optionally, the apparatus further includes:
  a first indication sending module, configured to send first indication information to the terminal, where the first indication information is used for instructing the terminal to determine a target configured grant suitable for blind retransmission communication in at least one configured grant.

Optionally, the configuration information includes a third timer, and the apparatus further includes:
  a third starting module, configured to start a third corresponding timer corresponding to the third timer after the downlink new transmission information is sent to the terminal during a semi-persistent scheduling communication procedure;
  a first downlink module, configured to perform blind retransmission of downlink information to the terminal according to scheduling information of the semi-persistent scheduling during a running period of the third corresponding timer.

Optionally, the configuration information includes a fourth timer, and the apparatus further includes:
  a fourth starting module, configured to start a fourth corresponding timer corresponding to the fourth timer after sending the downlink new transmission information to the terminal and after each blind retransmission of downlink information to the terminal during the semi-persistent scheduling communication procedure;
  a second downlink module, configured to stop the blind retransmission of downlink information to the terminal during a running period of the fourth corresponding timer, and after the fourth timer expires, perform blind retransmission of the downlink information to the terminal according to the scheduling information of semi-persistent scheduling.

Optionally, the apparatus further includes:
  a second indication sending module, configured to send second indication information to the terminal, where the second indication information is used for instructing the terminal to determine a target semi-persistent scheduling suitable for blind retransmission communication in at least one semi-persistent scheduling.

Optionally, the configuration information includes a fifth timer, and the apparatus further includes:
  a fifth starting module, configured to, during a discontinuous reception process of the terminal, after receiving the uplink new transmission information sent by the terminal or after receiving the blind retransmission of the uplink information from the terminal for the first time, start a fifth corresponding timer corresponding to the fifth timer;

an uplink control module, configured to stop sending dynamic scheduling to uplink blind retransmission to the terminal during a running period of the fifth corresponding timer.

Optionally, the configuration information further includes a sixth timer, and the apparatus further includes:

a sixth starting module, configured to start a sixth corresponding timer corresponding to the sixth timer after the fifth corresponding timer expires;

an uplink configuration sending module, configured to send dynamic scheduling for uplink blind retransmission to the terminal during a running period of the sixth corresponding timer;

an uplink receiving module, configured to receive blind retransmission of uplink information from the terminal according to uplink scheduling information.

Optionally, the apparatus further includes:

a first duration sending module, configured to send first duration configuration information for the fifth timer to the terminal, where the first duration configuration information is configured to indicate that an upper limit of a timing duration of the fifth timer is configured to be greater than 56 time-domain symbols.

Optionally, the configuration information includes a seventh timer, and the apparatus further includes:

a seventh starting module, configured to start a seventh corresponding timer corresponding to the seventh timer after transmitting new downlink information to the terminal or after the blind retransmission of downlink information to the terminal for the first time during the discontinuous reception process;

a downlink control module, configured to stop sending dynamic scheduling for downlink blind retransmission to the terminal during a running period of the seventh corresponding timer.

Optionally, the configuration information further includes an eighth timer, and the apparatus further includes:

an eighth starting module, configured to start an eighth corresponding timer corresponding to the eighth timer after the seventh corresponding timer expires;

a downlink configuration sending module, configured to send dynamic scheduling for downlink blind retransmission to the terminal during a running period of the eighth corresponding timer;

a downlink sending module, configured to perform blind retransmission of downlink information to the terminal according to the downlink scheduling information.

Optionally, the apparatus further includes:

a second duration sending module, configured to send second duration configuration information of the seventh timer to the terminal, where the second duration configuration information is configured to indicate that the upper limit of the timing duration of the seventh timer is configured to be greater than 56 time-domain symbols.

Regarding the apparatuses in the foregoing embodiments, the specific manners in which each module performs operations have been described in detail in the embodiments of the related methods, and will not be described in detail here.

For the apparatus embodiments, since they basically correspond to the method embodiments, reference may be made to the partial descriptions of the method embodiments for related parts. The apparatus embodiments described above are only illustrative, where the modules described as separate components may or may not be physically separated, and the components displayed as modules may or may not be physical modules, that is, they may be located in one place, or may be distributed over multiple network modules. Some or all of the modules may be selected according to actual needs to achieve the purpose of the solutions in the embodiments. Those of ordinary skill in the art can understand and implement them without creative effort.

Embodiments of the present disclosure also provide an electronic device, including:

a processor;

a memory for storing instructions executable by the processor;

where the processor is configured to implement the blind retransmission method described in any of the foregoing embodiments, and/or the blind retransmission indication method described in any of the foregoing embodiments.

Embodiments of the present disclosure further provide a computer-readable storage medium, on which a computer program is stored, and when the program is executed by a processor, the steps in the blind retransmission method described in any of the foregoing embodiments and/or the blind retransmission indication method described in any of the foregoing embodiments are implemented.

Figure 27:
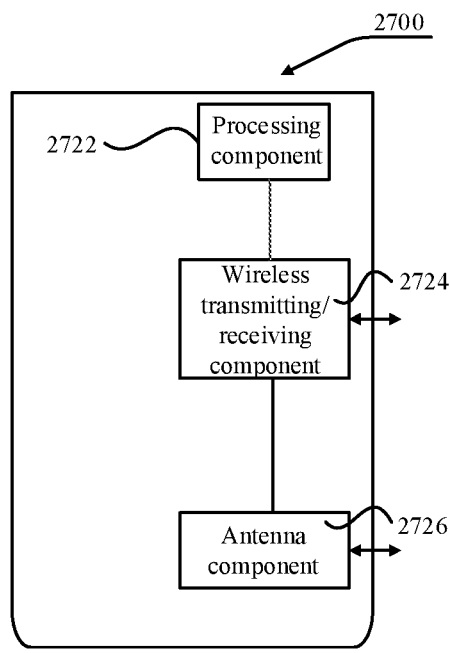
FIG. 27 is a schematic block diagram of an apparatus for blind retransmission indication according to an embodiment of the present disclosure.

As shown in FIG. 27, FIG. 27 is a schematic block diagram of an apparatus 2700 for blind retransmission indication according to an embodiment of the present disclosure. The apparatus 2700 may be provided as a base station. With reference to FIG. 27, the apparatus 2700 includes a processing component 2722, a wireless transmitting/receiving component 2724, an antenna component 2726, and a signal processing portion specific to a wireless interface. The processing component 2722 may further include one or more processors. One of the processors in the processing component 2722 may be configured to implement the blind retransmission indication method described in any of the foregoing embodiments.

Figure 28:
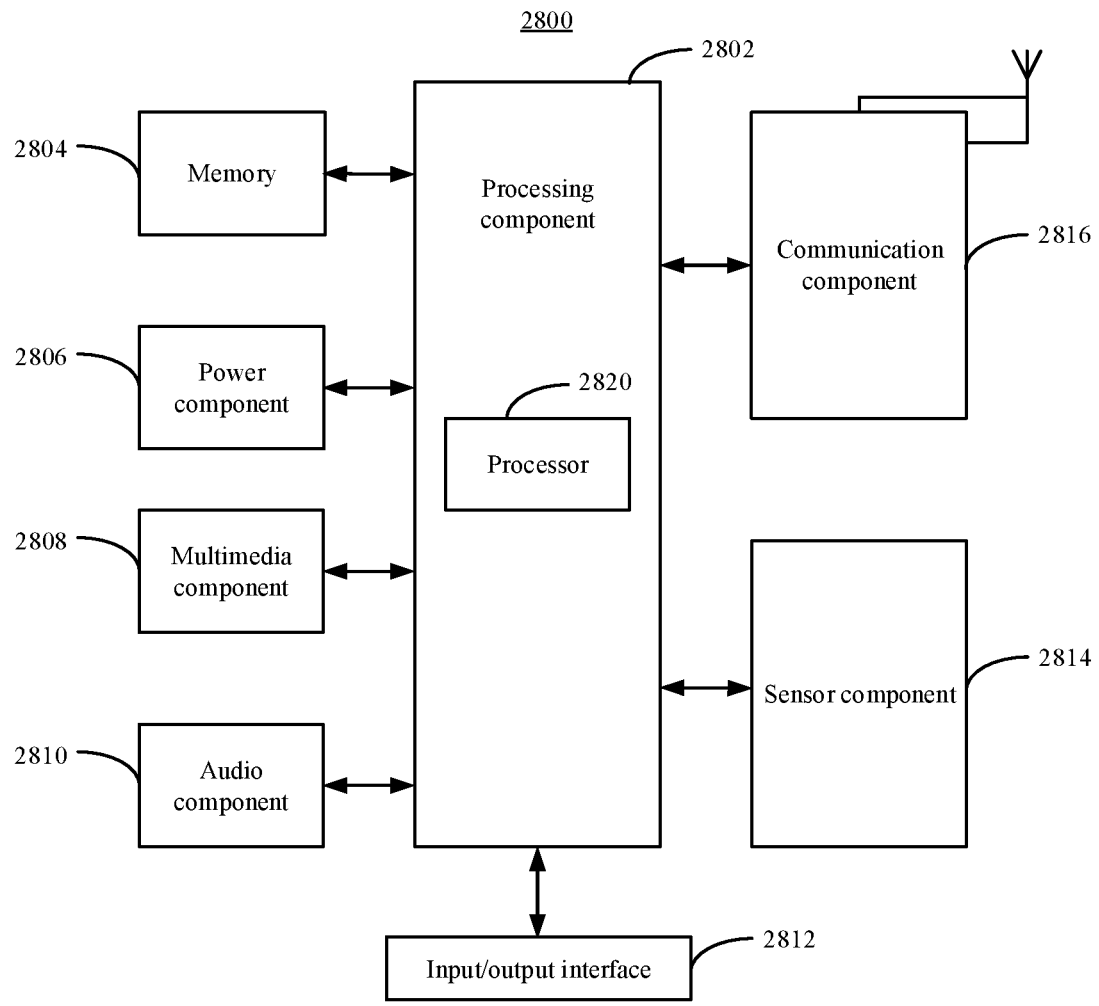
FIG. 28 is a schematic block diagram of an apparatus for blind retransmission according to an embodiment of the present disclosure.

FIG. 28 is a schematic block diagram of an apparatus 2800 for blind retransmission according to an embodiment of the present disclosure. For example, the apparatus 2800 may be a mobile phone, a computer, a digital broadcast terminal, a messaging apparatus, a gaming console, a tablet, a medical apparatus, exercise equipment, a personal digital assistant, etc.

Referring to FIG. 28, the apparatus 2800 may include one or more of the following components: a processing component 2802, a memory 2804, a power component 2806, a multimedia component 2808, an audio component 2810, an input/output (I/O) interface 2812, a sensor component 2814, and a communication component 2816.

The processing component 2802 typically controls overall operations of the apparatus 2800, such as the operations associated with display, telephone calls, data communications, camera operations, and recording operations. The processing component 2802 may include one or more processors 2820 to execute instructions to perform all or part of the steps in the above described blind retransmission methods. Moreover, the processing component 2802 may include one or more modules which facilitate the interaction between the processing component 2802 and other components. For instance, the processing component 2802 may include a multimedia module to facilitate the interaction between the multimedia component 2808 and the processing component 2802.

The memory 2804 is configured to store various types of data to support the operation of the apparatus 2800.

Examples of such data include instructions for any applications or methods operated on the apparatus 2800, contact data, phonebook data, messages, pictures, video, etc. The memory 2804 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or an optical disk.

The power component 2806 provides power to various components of the apparatus 2800. The power component 2806 may include a power management system, one or more power sources, and any other components associated with the generation, management, and distribution of power in the apparatus 2800.

The multimedia component 2808 includes a screen providing an output interface between the apparatus 2800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2808 includes a front camera and/or a rear camera. The front camera and the rear camera may receive an external multimedia datum while the apparatus 2800 is in an operation mode, such as a photographing mode or a video mode. Each of the front camera and the rear camera may be a fixed optical lens system or have focus and optical zoom capability.

The audio component 2810 is configured to output and/or input audio signals. For example, the audio component 2810 includes a microphone (MIC) configured to receive an external audio signal when the apparatus 2800 is in an operation mode, such as a call mode, a recording mode, and a voice recognition mode. The received audio signal may be further stored in the memory 2804 or transmitted via the communication component 2816. In some embodiments, the audio component 2810 further includes a speaker to output audio signals.

The I/O interface 2812 provides an interface between the processing component 2802 and peripheral interface modules, such as a keyboard, a click wheel, buttons, and the like. The buttons may include, but are not limited to, a home button, a volume button, a starting button, and a locking button.

The sensor component 2814 includes one or more sensors to provide status assessments of various aspects of the apparatus 2800. For instance, the sensor component 2814 may detect an open/closed status of the apparatus 2800, relative positioning of components, e.g., the display and the keypad, of the apparatus 2800, a change in position of the apparatus 2800 or a component of the apparatus 2800, a presence or absence of user contact with the apparatus 2800, an orientation or an acceleration/deceleration of the apparatus 2800, and a change in temperature of the apparatus 2800. The sensor component 2814 may include a proximity sensor configured to detect the presence of nearby objects without any physical contact. The sensor component 2814 may also include a light sensor, such as a CMOS or CCD image sensor, for use in imaging applications. In some embodiments, the sensor component 2814 may also include an accelerometer sensor, a gyroscope sensor, a magnetic sensor, a pressure sensor, or a temperature sensor.

The communication component 2816 is configured to facilitate communication, wired or wirelessly, between the apparatus 2800 and other apparatus. The apparatus 2800 may access a wireless network based on a communication standard, such as WiFi, 2G, or 3G, 4G LTE, 5G NR or a combination thereof. In one exemplary embodiment, the communication component 2816 receives a broadcast signal or broadcast associated information from an external broadcast management system via a broadcast channel. In one exemplary embodiment, the communication component 2816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 2800 may be implemented with one or more application specific integrated circuits (ASICs), digital signal processors (DSPs), digital signal processing apparatuses (DSPDs), programmable logic apparatuses (PLDs), field programmable gate arrays (FPGAs), controllers, micro-controllers, microprocessors, or other electronic components, for performing the above described blind retransmission methods.

In exemplary embodiments, there is also provided a non-transitory computer-readable storage medium including instructions, such as the memory 2804 including instructions, the above instructions may be executed by the processor 2820 in the apparatus 2800 for performing the above-described blind retransmission methods. For example, the non-transitory computer-readable storage medium may be a ROM, a Random Access Memory (RAM), a CD-ROM, a magnetic tape, a floppy disc, an optical data storage device, and the like.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims. Even if the receiving side is prohibited from sending hybrid automatic repeat request feedback to the sending side, the sensing side can also blindly retransmit information. Thus, it is conducive to ensuring that the receiving side in the communication process receives the information sent by the sending side, thereby enabling the subsequent communication process to proceed smoothly.

It should be noted that, in the present disclosure, relationship terms such as first and second are only used to distinguish one entity or operation from another entity or operation, and do not necessarily require or imply any such actual relationship or sequence exists between these entities or operations. The terms "include", "contain" or any other variation thereof are intended to encompass non-exclusive inclusion such that a process, method, article or device including a list of elements includes not only those elements, but also other not expressly listed elements, or also include elements inherent to such process, method, article or device. Without further limitation, an element limited by the phrase "including one . . . " does not preclude the presence of additional identical elements in the process, method, article or apparatus that includes the element.

The methods and apparatuses provided by the embodiments of the present disclosure have been described in detail above, and specific examples are used to illustrate the principles and implementations of the present disclosure. The above description of the embodiments is only used to help to understand the method and core ideas of the present disclosure. At the same time, for those of ordinary skill in the art, according to the idea of the present disclosure, there will be changes in the specific implementation and application scope. In summary, the content of this specification should not be construed as a limitation to the present disclosure.

What is claimed is:

1. A blind retransmission method, applied to a terminal, the method comprising:
   receiving configuration information of blind retransmission sent by a base station; and
   performing blind retransmission communication with the base station according to the configuration information, wherein the configuration information comprises a second timer, during a configured grant communication procedure, after sending uplink new transmission information to the base station and after each blind retransmission of uplink information to the base station, starting the second timer;
   during a running period of the second timer, stopping the blind retransmission of the uplink information to the base station, and after expiration of the second timer, performing blind retransmission of uplink information to the base station according to scheduling information of the configured grant;
   receiving first indication information sent by the base station;
   according to the first indication information, determining a target configured grant suitable for the blind retransmission communication in at least one configured grant; and
   in at least one Hybrid Automatic Repeat request (HARQ) process, determining a blind retransmission HARQ process available for the target configured grant according to at least one of an offset or a number of identifiers of HARQs used for the blind retransmission.

2. The method according to claim 1, wherein the configuration information comprises a first timer, and the performing blind retransmission communication with the base station according to the configuration information comprises:
   during a configured grant communication procedure, after sending uplink new transmission information to the base station, starting the first timer; and
   during a running period of the first timer, performing blind retransmission of uplink information to the base station according to scheduling information of the configured grant.

3. The method according to claim 1, wherein an identifier of a hybrid automatic repeat request process used for performing blind retransmission of uplink information to the base station is determined according to an uplink time of the blind retransmission of uplink information to the base station.

4. The method according to claim 1, wherein the configuration information comprises a third timer, and the performing blind retransmission communication with the base station according to the configuration information comprises:
   in a semi-persistent scheduling communication procedure, after receiving downlink new transmission information sent by the base station, starting the third timer;
   during a running period of the third timer, determining that received downlink information sent by the base station is blind retransmission of downlink information.

5. The method according to claim 1, wherein the configuration information comprises a fourth timer, and the performing blind retransmission communication with the base station according to the configuration information comprises:
   in a semi-persistent scheduling communication procedure, after receiving downlink new transmission information sent by the base station and after each reception of blind retransmission of downlink information from the base station, starting the fourth timer; and
   during a running period of the fourth timer, stopping receiving the blind retransmission of downlink information from the base station, and after expiration of the fourth timer, receiving the blind retransmission of downlink information from the base station.

6. The method according to claim 1, wherein the configuration information comprises a fifth timer, and the performing blind retransmission communication with the base station according to the configuration information comprises:
   in a process of discontinuous reception, after sending uplink new transmission information to the base station or after the blind retransmission of uplink information to the base station for the first time, starting the fifth timer; and
   during a running period of the fifth timer, not monitoring a dynamic scheduling to uplink blind retransmission from the base station.

7. The method according to claim 6, wherein the configuration information further comprises a sixth timer, and the performing blind retransmission communication with the base station according to the configuration information further comprises:
   after expiration of the fifth timer, starting the sixth timer;
   during a running period of the sixth timer, monitoring the dynamic scheduling to the uplink blind retransmission from the base station; and
   performing the blind retransmission of uplink information to the base station according to uplink scheduling information.

8. The method according to claim 1, wherein the configuration information comprises a seventh timer, and the performing blind retransmission communication with the base station according to the configuration information comprises:
   in a process of discontinuous reception, after reception of downlink new transmission information sent by the base station or after reception of the blind retransmission of downlink information from the base station, starting the seventh timer; and
   during a running period of the seventh timer, not monitoring a dynamic scheduling to downlink blind retransmission from the base station.

9. The method according to claim 8, wherein the configuration information further comprises an eighth timer, and the performing blind retransmission communication with the base station according to the configuration information further comprises:

after expiration of the seventh timer, starting the eighth timer;

during a running period of the eighth timer, monitoring a dynamic scheduling to downlink blind retransmission from the base station; and receiving the blind retransmission of downlink information from the base station according to downlink scheduling information.

10. A blind retransmission indication method, applied to a base station, the method comprising:

sending configuration information of blind retransmission to a terminal, wherein the configuration information is configured to instruct the terminal to perform blind retransmission communication with the base station according to the configuration information, wherein the configuration information comprises a second timer, during a configured grant communication procedure, after receiving uplink new transmission information sent by the terminal and after each reception of blind retransmission of uplink information from the terminal, starting a second corresponding timing corresponding to the second timer;

during a running period of the second corresponding timer, stopping receiving the blind retransmission of uplink information from the terminal, and after expiration of the second corresponding timer, receiving the blind retransmission of uplink information from the terminal according to scheduling information of the configured grant; and sending first indication information to the terminal, wherein the first indication information is used for instructing the terminal to determine a target configured grant suitable for the blind retransmission communication in at least one configured grant, wherein in at least one Hybrid Automatic Repeat request (HARQ) process, a blind retransmission HARQ process available for the target configured grant is determined according to at least one of an offset or a number of identifiers of HARQs used for the blind retransmission.

11. The method according to claim 10, wherein the configuration information comprises a first timer, and the method further comprises:

during a configured grant communication procedure, after receiving uplink new transmission information sent by the terminal, starting a first corresponding timer corresponding to the first timer; and during a running period of the first corresponding timer, receiving blind retransmission of uplink information from the terminal according to scheduling information of the configured grant.

12. The method according to claim 10, wherein the configuration information comprises a third timer, and the method further comprises:

in a semi-persistent scheduling communication procedure, after sending downlink new transmission information to the terminal, starting a third corresponding timer corresponding to the third timer; and during a running period of the third corresponding timer, performing blind retransmission of downlink information to the terminal according to scheduling information of the semi-persistent scheduling.

13. The method according to claim 10, wherein the configuration information comprises a fourth timer, and the method further comprises:

in a semi-persistent scheduling communication procedure, after sending downlink new transmission information to the terminal and after each blind retransmission of downlink information to the terminal, starting a fourth corresponding timer corresponding to the fourth timer; and during a running period of the fourth corresponding timer, stopping the blind retransmission of the downlink information to the terminal, and after expiration of the fourth timer, performing blind retransmission of the downlink information to the terminal according to scheduling information of the semi-persistent scheduling.

14. The method according to claim 10, wherein the configuration information comprises a fifth timer, and the method further comprises:

in a process of discontinuous reception of the terminal, after receiving uplink new transmission information sent by the terminal or after receiving blind retransmission of uplink information from the terminal for the first time, starting a fifth corresponding timer corresponding to the fifth timer; and during a running period of the fifth corresponding timer, stopping sending a dynamic scheduling to uplink blind retransmission to the terminal.

15. The method according to claim 14, wherein the configuration information further comprises a sixth timer, and the method further comprises:

after expiration of the fifth corresponding timer, starting a sixth corresponding timer corresponding to the sixth timer;

during a running period of the sixth corresponding timer, sending a dynamic scheduling to uplink blind retransmission to the terminal; and receiving the blind retransmission of uplink information from the terminal according to uplink scheduling information.

16. The method according to claim 10, wherein the configuration information comprises a seventh timer, and the method further comprises:

in a process of discontinuous reception, after transmitting downlink new transmission information to the terminal or after the blind retransmission of downlink information to the terminal for the first time, starting a seventh corresponding timer corresponding to the seventh timer; and during a running period of the seventh corresponding timer, stopping sending a dynamic scheduling to downlink blind retransmission to the terminal.

17. The method according to claim 16, wherein the configuration information further comprises an eighth timer, and the method further comprises:

after expiration of the seventh corresponding timer, starting an eighth corresponding timer corresponding to the eighth timer;

during a running period of the eighth corresponding timer, sending a dynamic scheduling to downlink blind retransmission to the terminal; and performing blind retransmission of the downlink information to the terminal according to downlink scheduling information.

18. An electronic device, comprising:

a processor; and a memory for storing instructions executable by the processor;

wherein the processor is configured to implement:

receiving configuration information of blind retransmission sent by a base station; and performing blind retransmission communication with the base station according to the configuration information, wherein the configuration information comprises a second timer, and the performing blind retransmission communication with the base station according to the configuration information comprises:

during a configured grant communication procedure, after sending uplink new transmission information to the base station and after each blind retransmission of uplink information to the base station, starting the second timer;

during a running period of the second timer, stopping the blind retransmission of the uplink information to the base station, and after expiration of the second timer, performing blind retransmission of uplink information to the base station according to scheduling information of the configured grant;

receiving first indication information sent by the base station;

according to the first indication information, determining a target configured grant suitable for the blind retransmission communication in at least one configured grant; and in at least one Hybrid Automatic Repeat request (HARQ) process, determining a blind retransmission HARQ process available for the target configured grant according to at least one of an offset or a number of identifiers of HARQs used for the blind retransmission.

\* \* \* \* \*